(12) United States Patent
Belbruno

(10) Patent No.: US 6,385,512 B1
(45) Date of Patent: May 7, 2002

(54) SYSTEM AND METHOD OF A BALLISTIC CAPTURE TRANSFER TO L4, L5

(75) Inventor: Edward A. Belbruno, Princeton, NJ (US)

(73) Assignee: Galaxy Development LLC, Van Nuys, CA (US)

(*) Notice: Subject to any disclaimer, the term of this patent is extended or adjusted under 35 U.S.C. 154(b) by 0 days.

(21) Appl. No.: 09/549,585

(22) Filed: Apr. 14, 2000

Related U.S. Application Data

(60) Provisional application No. 60/129,688, filed on Apr. 16, 1999.

(51) Int. Cl.$^7$ .............................. B64G 1/24; B64G 1/10
(52) U.S. Cl. ...................... 701/13; 701/226; 244/158 R
(58) Field of Search ................. 701/13, 226; 244/158 R

(56) References Cited

U.S. PATENT DOCUMENTS

| | | |
|---|---|---|
| 3,532,298 A | 10/1970 | Swet |
| 3,676,581 A | 7/1972 | Swet |
| T100,604 I4 | 5/1981 | Crill et al. |
| 4,288,051 A | 9/1981 | Göschel |
| 4,599,697 A | 7/1986 | Chan et al. |
| 4,618,112 A | 10/1986 | Keigler |
| 5,064,152 A | 11/1991 | Maute |
| 5,067,672 A | 11/1991 | Bouzat |
| 5,120,008 A | 6/1992 | Ramohalli |
| 5,158,249 A | 10/1992 | Uphoff |
| 5,163,640 A | 11/1992 | Altobelli |
| 5,199,672 A | 4/1993 | King et al. |
| 5,421,540 A | 6/1995 | Ting |
| 5,433,726 A | 7/1995 | Horstein et al. |
| 5,452,869 A | 9/1995 | Basuthakur et al. |
| 5,506,780 A | 4/1996 | Montenbruck et al. |
| 5,507,454 A | 4/1996 | Dulck |
| 5,568,904 A | 10/1996 | Brock et al. |
| 5,595,360 A | 1/1997 | Spitzer |
| 5,681,011 A | 10/1997 | Frazier |

OTHER PUBLICATIONS

Belbruno et al., "Laser Interferometer Gravity Wave Antenna in Space", JPL D–9908, Final Report, Jul. 1992.*
Frank, A., "Gravity's Rim: Riding Chaos to the Moon", Discover, Sep. 1994, pp. 74–79.*
Graziani, F., Castronuovo, M.M., and Teofilatto, P. "Geostationary Orbits from Mid–Latitude Launch Sites Via Lunar Gravity Assist" An American Astronautical Society Publication reprinted from Spaceflight Dynamics 1993, vol. 84 (pp. 561–572).
Belbruno et al., 1993 "Sun–Perturbed Earth–to–Moon Transfers with Ballistic Capture", *J. Guidance Control and Dynamics.*, vol. 16(4), pp. 770–775.

(List continued on next page.)

*Primary Examiner*—Michael J. Zanelli
*Assistant Examiner*—Eric M. Gibson
(74) *Attorney, Agent, or Firm*—Irah H. Donner; Luke J. Yeh; Yale and Dorr LLP

(57) ABSTRACT

A technique for transferring an object such as a spacecraft to one of the stable Lagrange points, for instance L4 or L5, utilizes a substantially negligible amount of delta-V. In doing so, payload amounts may be increased. Initially, a modified weak stability boundary transfer with parameters sufficient to transfer the spacecraft from a first heavenly object or a first heavenly object orbit to a vicinity of a second heavenly object is performed. Then, the spacecraft is momentarily captured at a capture point located in the vicinity of the second heavenly object. Upon capture, a maneuver is executed at the capture point to target the stable Lagrange point utilizing a substantially negligible amount of propellant. Finally, the spacecraft arrives at the stable Lagrange point.

57 Claims, 20 Drawing Sheets

OTHER PUBLICATIONS

E. Belbruno, 1994 "Ballistic Lunar Capture Transfers Using the Fuzzy Boundary and Solar Perturbations: A Survey", *J. Brit. Interplanetary Soc.,* vol. 47(2), pp. 73–80.

Yamakawa et al., "On Earth–Moon Transfer Trajectory With Gravitational Capture", The Institute of Space and Astronautical Science, pp. 1–20, No Date.

Kawaguchi et al., 1995 "On Making Use of Lunar and Solar Gravity Assits in Lunar–A, Planet–B Missions", *Acta Astronautica.,* vol. 35 (9–10), pp. 633–642.

Cook et al., 1990 "Return to the Moon: The Lunar Observer Mission", Jet Propulsion Laboratory, *California Institute of Technology.,* pp. 232–245.

E. Belbruno, 1994 "The Dynamical Mechanism of Ballistic Lunar Capture Transfers In the Four–Body Problem FromThe Perspective of Invariant Manifolds and Hills Regions", *The Geometry Center;* University of Minnesota., No 270, pp. 1–24.

* cited by examiner

SYSTEM AND METHOD OF A BALLISTIC CAPTURE TRANSFER TO L4, L5

RELATED APPLICATIONS

This patent application claims priority from U.S. provisional patent application Ser. No. 60/129,688 filed Apr. 16, 1999, to Edward A. Belbruno, which is incorporated herein by reference including all references cited therein.

This patent application is related to U.S. Provisional patent application Ser. No. 60/036,864, filed Feb. 4, 1997, U.S. provisional patent application Ser. No. 60/041,465, filed Mar. 25, 1997, U.S. provisional patent application Ser. No. 60/044,318 filed Apr. 24, 1997, and U.S. provisional patent application Ser. No. 60/048,244, filed Jun. 2, 1997, all to Edward A. Belbruno, and all of which are incorporated herein by reference, including all references cited therein.

This patent application is also related to U.S. patent application Ser. No. 09/304,265, filed on May 6, 1999; now U.S. Pat. No. 6,097,997 and U.S. patent application Ser. No. 09/306,793, filed on May 7, 1999, now U.S. Pat. No. 6,253,124 all to inventor Edward A. Belbruno, and all of which are incorporated herein by reference, including all references cited therein.

This patent application is also related to PCT Patent Application PCT/US98/01924, filed Feb. 4, 1998, PCT Patent Application PCT/US98/05784, filed Mar. 25, 1998, PCT Patent Application PCT/US98/08247, filed Apr. 24, 1998, all to inventor Edward A. Belbruno, and all of which are incorporated herein by reference, including all references cited therein.

BACKGROUND OF THE INVENTION

1. Field of the Invention

This invention relates in general to methods for space travel, and in particular, to methods for transferring an object, such as a satellite, spacecraft, or space station, and the like to a stable Lagrange point, such as, for instance, L4 or L5.

2. Background of the Related Art

The study of motion of objects, including celestial objects, originated, in part, with Newtonian mechanics. During the eighteenth and nineteenth centuries, Newtonian mechanics, using a law of motion described by acceleration provided an orderly and useful framework to solve most of the celestial mechanical problems of interest for that time. In order to specify the initial state of a Newtonian system, the velocities and positions of each particle must be specified.

However, in the mid-nineteenth century, Hamilton recast the formulation of dynamical systems by introducing the so-called Hamiltonian function, H, which represents the total energy of the system expressed in terms of the position and momentum, which is a first-order differential equation description. This first order aspect of the Hamiltonian, which represents a universal formalism for modeling dynamical systems in physics, implies a determinism for classical systems, as well as a link to quantum mechanics.

By the early 1900s, Poincare understood that the classical Newtonian three-body problem gave rise to a complicated set of dynamics that was very sensitive to dependence on initial conditions, which today is referred to as "chaos theory." The origin of chaotic motion can be traced back to classical (Hamiltonian) mechanics which is the foundation of (modern) classical physics. In particular, it was nonintegrable Hamiltonian mechanics and the associated nonlinear problems which posed both the dilemma and ultimately the insight into the occurrence of randomness and unpredictability in apparently completely deterministic systems.

The advent of the computer provided the tools which were hitherto lacking to earlier researchers, such as Poincare, and which relegated the nonintegrable Hamiltonian mechanics from the mainstream of physics research. With the development of computational methodology combined with deep intuitive insights, the early 1960s gave rise to the formulation of the KAM theorem, named after A. N. Kolmogorov, V. I. Arnold, and J. Moser, that provided the conditions for randomness and unpredictability for nearly nonintegrable Hamiltonian systems.

Within the framework of current thinking, almost synonymous with certain classes of nonlinear problems is the so-called chaotic behavior. Chaos is not just simply disorder, but rather an order without periodicity. An interesting and revealing aspect of chaotic behavior is that it can appear random when the generating algorithms are finite, as described by the so-called logistic equations.

Chaotic motion is important for astrophysical (orbital) problems in particular, simply because very often within generally chaotic domains, patterns of ordered motion can be interspersed with chaotic activity at smaller scales. Because of the scale characteristics, the key element is to achieve sufficiently high resolving power in the numerical computation in order to describe precisely the quantitative behavior that can reveal certain types of chaotic activity. Such precision is required because instead of the much more familiar spatial or temporal periodicity, a type of scale invariance manifests itself. This scale invariance, discovered by Feigenbaum for one-dimensional mappings, provided for the possibility of analyzing renormalization group considerations within chaotic transitions.

Insights into stochastic mechanics have also been derived from related developments in nonlinear analysis, such as the relationship between nonlinear dynamics and modern ergodic theory. For example, if time averages along a trajectory on an energy surface are equal to the ensemble averages over the entire energy surface, a system is said to be ergodic on its energy surface. In the case of classical systems, randomness is closely related to ergodicity. When characterizing attractors in dissipative systems, similarities to ergodic behavior are encountered.

An example of a system's inherent randomness is the work of E. N. Lorenz on thermal convection, which demonstrated that completely deterministic systems of three ordinary differential equations underwent irregular fluctuations. Such bounded, nonperiodic solutions which are unstable can introduce turbulence, and hence the appellation "chaos," which connotes the apparent random motion of some mappings. One test that can be used to distinguish chaos from true randomness is through invocation of algorithmic complexity; a random sequence of zeros and ones can only be reproduced by copying the entire sequence, i.e., periodicity is of no assistance.

The Hamiltonian formulation seeks to describe motion in terms of first-order equations of motion. The usefulness of the Hamiltonian viewpoint lies in providing a framework for the theoretical extensions into many physical models, foremost among which is celestial mechanics. Hamiltonian equations hold for both special and general relativity. Furthermore, within classical mechanics it forms the basis for further development, such as the familiar Hamilton-Jacobi method and, of even greater extension, the basis for perturbation methods. This latter aspect of Hamiltonian theory will provide a starting point for the analytical discussions to follow in this brief outline.

As already mentioned, the Hamiltonian formulation basically seeks to describe motion in terms of first-order equations of motion. Generally, the motion of an integrable Hamilton system with N degrees of freedom is periodic and confined to the N-torus as shown in FIG. 1. FIG. 1 depicts an integrable system with two degrees of freedom on a torus, and a closed orbit of a trajectory. The KAM tori are concentric versions of the single torus. Hamiltonian systems for which N=1 are all integrable, while the vast majority of systems with N greater than or equal to 2 become nonintegrable.

An integral of motion which makes it possible to reduce the order of a set of equations, is called the first integral. To integrate a set of differential equations of the order 2N, that same number of integrals are generally required, except in the case of the Hamiltonian equations of motion, where N integrals are sufficient. This also can be expressed in terms of the Liouville theorem, which states that any region of phase space must remain constant under any (integrable) Hamiltonian formalism. The phase space region can change its shape, but not its phase space volume. Therefore, for any conservative dynamical system, such as planetary motion or pendula that does not have an attracting point, the phase space must remain constant.

Another outcome of the Hamiltonian formulation, which started out as a formulation for regular motion, is the implication of the existence of irregular and chaotic trajectories. Poincare realized that nonintegrable, classical, three-body systems could lead to chaotic trajectories. Chaotic behavior is due neither to a large number of degrees of freedom nor to any initial numerical imprecision. Chaotic behavior arises from a nonlinearity in the Hamiltonian equations with initially close trajectories that separate exponentially fast into a bounded region of phase space. Since initial conditions can only be measured with a finite accuracy and the errors propagate at an exponential rate, the long range behavior of these systems cannot be predicted.

The effects of perturbations in establishing regions of nonintegrability can be described for a weak perturbation using the KAM theorem. The KAM theorem, originally stated by Kolmogorov, and rigorously proven by Arnold and Moser, analyzed perturbative solutions to the classical many-body problem. The KAM theorem states that provided the perturbation is small, the perturbation is confined to an N-torus except for a negligible set of initial conditions which may lead to a wandering motion on the energy surface. This wandering motion is chaotic, implying a great sensitivity to initial conditions.

The N-tori, in this case, are known as KAM surfaces. When observed as plane sections they are often called KAM curves as illustrated in FIG. 2. These surfaces and curves may be slightly distorted (perturbed). That is, for a sufficiently small conservative Hamiltonian perturbation, most of the nonresonant invariant tori will not vanish, but will undergo a slight deformation, such that in the perturbed system phase space there are also invariant tori, filled by phase curves, which are conditionally periodic.

FIG. 2 illustrates a set of KAM invariant tori on the surface of which lie as elliptic integrable solutions. The nonintegrable solutions, irregular paths, which are hyperbolic in nature lie in between the invariant tori in so-called resonant zones, which are also sometimes referred to as stochastic zones.

The KAM results were extended through the results of J. Mather. KAM theory treats motions and related orbits that are very close to being well behaved and stable. Since KAM theory is basically a perturbation analysis, by its very nature the perturbation constant must be very small. Strong departures from the original operator through the perturbation parameter will invalidate the use of the original eigenfunctions used to generate the set of perturbed eigenfunctions. Mather's work analyzes unstable motions which are far from being well behaved. The perturbation can be relatively strong, and entirely new eigenfunctions (solutions) can be generated.

The practical importance of Mather's work for planetary orbit, escape, and capture is that the dynamics are applicable to those regions in phase space (i.e., Mather regions) associated with three- and four-body problems. Mather proved that for chaotic regions in lower (two) dimensions for any conservative Hamiltonian System, there exists or remains elliptical orbits which are unstable. In terms of NEO (near-Earth object) issues, KAM and Mather regions are important for describing both the orbital motions of comets, as well as for planning fuel conserving ballistic (flyby, rendezvous, and interception) trajectories to comets and other NEOs. The above discussion is a summary of the article by John L. Remo, entitled "NEO Orbits and Nonlinear Dynamics: A Brief Overview and Interpretations," 822 Annals of the New York Academy of Sciences 176–194 (1997), incorporated herein by reference, including the references cited therein.

In light of the theoretical aspects of space travel discussed above, some of the practical applications resulting therefrom are now described. Since the first lunar missions in the 1960s, the moon has been the object of interest of both scientific research and potential commercial development. During the 1980s, several lunar missions were launched by national space agencies. Interest in the moon is increasing with the advent of the multi-national space station making it possible to stage lunar missions from low earth orbit. However, continued interest in the moon and the feasibility of a lunar base will depend, in part, on the ability to schedule frequent and economical lunar missions.

A typical lunar mission comprises the following steps. Initially, a spacecraft is launched from earth or low earth orbit with sufficient impulse per unit mass, or change in velocity, to place the spacecraft into an earth-to-moon orbit. Generally, this orbit is a substantially elliptic earth-relative orbit having an apogee selected to nearly match the radius of the moon's earth-relative orbit.

As the spacecraft approaches the moon, a change in velocity is provided to transfer the spacecraft from the earth-to-moon orbit to a moon-relative orbit. An additional change in velocity may then be provided to transfer the spacecraft from the moon-relative orbit to the moon's surface if a moon landing is planned. When a return trip to the earth is desired, another change in velocity is provided which is sufficient to insert the spacecraft into a moon-to-earth orbit, for example, an orbit similar to the earth-to-moon orbit. Finally, as the spacecraft approaches the earth, a change in velocity is required to transfer the spacecraft from the moon-to-earth orbit to a low earth orbit or an earth return trajectory.

FIG. 3 is an illustration of an orbital system in accordance with a conventional lunar mission in a non-rotating coordinate system wherein the X-axis 10 and Y-axis 12 lay in the plane defined by the moon's earth-relative orbit 36, and the Z-axis 18 is normal thereto. In a typical lunar mission, a spacecraft is launched from earth 16 or low earth orbit 20, which may or may not be circular, and provided with sufficient velocity to place the spacecraft into an earth-to-moon orbit 22.

Near the moon 14, a change in velocity is provided to reduce the spacecraft's moon-relative energy and transfer the spacecraft into a moon-relative orbit 24, which may or may not be circular. An additional change in velocity is then provided to transfer the spacecraft from the moon-relative orbit 24 to the moon 14 by way of the moon landing trajectory 25. When an earth-return is desired, a change in velocity sufficient to place the spacecraft into a moon-to-earth orbit 26 is provided either directly from the moon's surface or through multiple impulses as in the descent. Finally, near earth 16, a change in velocity is provided to reduce the spacecraft's earth-relative energy and to return the spacecraft to low earth orbit 20 or to earth 16 via the earth-return trajectory 27.

FIG. 4 is an illustration of another conventional orbital system, described in U.S. Pat. No. 5,158,249 to Uphoff, incorporated herein by reference, including the references cited therein. The orbital system 28 comprises a plurality of earth-relative orbits, where transfer therebetween is accomplished by using the moon's gravitational field. The moon's gravitation field is used by targeting, through relatively small mid-orbit changes in velocity, for lunar swingby conditions which yield the desired orbit.

Although the earth-relative orbits in the orbital system 28 may be selected so that they all have the same Jacobian constant, thus indicating that the transfers therebetween can be achieved with no propellant-supplied change in velocity in the nominal case, relatively small propellant-supplied changes in velocity may be required. Propellant-supplied changes in velocity may be required to correct for targeting errors at previous lunar swingbys, to choose between alternative orbits achievable at a given swingby, and to account for changes in Jacobian constant due to the eccentricity of the moon's earth-relative orbit 36.

In FIG. 4, a spacecraft is launched from earth 16 or low earth orbit into an earth-to-moon orbit 22. The earth-to-moon orbit 22 may comprise, for example, a near minimal energy earth-to-moon trajectory, for example, an orbit having an apogee distance that nearly matches the moon's earth-relative orbit 36 radius. The spacecraft encounters the moon's sphere of gravitational influence 30 and uses the moon's gravitational field to transfer to a first earth-relative orbit 32.

The first earth-relative orbit 32 comprises, for example, approximately one-half revolution of a substantially one lunar month near circular orbit which has a semi-major axis and eccentricity substantially the same as the moon's earth-relative orbit 36, which is inclined 42 approximately 46.3 degrees relative to the plane defined by the moon's earth-relative orbit 36, and which originates and terminates within the moon's sphere of influence 30. Because the first earth-relative orbit 32 and a typical near minimum energy earth-to-moon orbit 22 have the same Jacobian constant, the transfer can be accomplished by using the moon's gravitational field.

FIG. 5 is an illustration of another orbital system where, for example, satellites orbit the earth. A central station SC is situated at the center of a spherical triangle-shaped covering zone Z. Two geosynchronous satellites S-A and S-B have elliptical orbits with identical parameters. These parameters may be, for example, the following:

apogee situated at about 50,543.4 km,
perigee situated at about 21,028.6 km,
meniscal axis of 42,164 km,
inclination of 63 degrees,
perigee argument 270,
orbit excentricity 0.35.

Each satellite includes an antenna or antennae 11 and 11a, with each antenna orientated towards the central station throughout the period when the satellite moves above the covering zone. The central station includes one connection station and one control station. FIG. 5 also shows a mobile unit M (which is situated inside zone Z, but which is shown above the latter for the sake of clarity). This mobile unit is equipped with an antenna 14a whose axis continuously points substantially towards the zenith.

In order to station such satellites, a large number of strategies are possible. One exemplary strategy is described with reference to FIG. 6. This strategy uses the ARIANE IV rocket and requires three pulses. At the time of launching, the satellite is accompanied by an ordinary geostationary satellite. The two satellites are placed on the standard transfer orbit of the ARIANE IV rocket, this orbit being situated within a quasi-equatorial plane (inclination of 7 degrees) with a perigee at 200 km, an apogee at 35,975 km and a perigee argument of 178 degrees. The orbit is marked as OST on FIG. 6.

Close to the perigee, a satellite rocket is ignited for a first pulse suitable for raising the apogee to 98,000 km, the orbit remaining within the same plane, orbit 01. This pulse may be broken down into two or three pulses. Close to the apogee of the orbit 01, a new pulse is sent to the satellite to change the plane of its orbit. The inclination of this plane is close to that of the plane of the definitive orbit, namely 63 degrees. This thrust is the largest and may be broken down into two or three thrusts. The orbit then becomes 02.

Finally, at an appropriate point of this orbit, a third thrust is sent to the satellite so as to provide it with a definitive orbit. If this strategy is satisfactory in certain respects, it nevertheless does constitute a drawback. In fact, it requires that the orbital plane be tilted when passing from the orbit 01 to the orbit 02, this results in a considerable consumption of propellant.

FIG. 7 is an illustration of another conventional lunar gravitational assistance transfer principle. In FIG. 7, the satellite is firstly transferred onto a standard orbit 01 situated inside a quasi-equatorial plane, which, in practice, is the orbit OST of FIG. 6, known as a Geostationary Transfer Orbit (GTO) orbit. At T1, the satellite is transferred onto a circumlunar orbit 02, still situated in the quasi-equatorial plane.

In practice, an extremely elliptic orbit is selected whose major axis is close to twice the Earth/Moon distance, namely about 768,800 km. The satellite penetrates into the sphere of influence SI of the moon and leaves this sphere on a trajectory 03 whose plane is highly inclined with respect to the equatorial plane. At T2, the satellite is injected onto the definitive orbit 04 inside the same plane as the orbit 03. The above described orbital system is described in detail in U.S. Pat. No. 5,507,454 to Dulck, incorporated herein by reference, including the references cited therein.

Dulck attempts to minimize the thrusters needed, where the standard technique of lunar gravity assist is used. The satellite is first brought to a neighborhood of the moon by a Hohmann transfer. It then flies by the moon in just the right directions and velocities, where it is broken up into two or more maneuvers. This method works, but the size of this maneuver restricts the applications of the method to ellipses whose eccentricities are sufficiently large. This is because to have a savings with this large maneuver, the final maneuver needs to be sufficiently small.

Associated with the problem of transferring objects to the moon, is the problem of transferring objects to one of the stable equilateral Lagrange points, two of which are commonly referred to as L4 or L5. The Lagrange points L1, L2, L3, L4, and L5 are named after the Italian-French mathematician Josef Lagrange and are used to characterize five special areas of interest in the vicinity of two orbiting masses where a third, smaller mass can orbit at a fixed distance from the larger masses. More precisely, the Lagrange points mark positions where the gravitational pull of the two large masses precisely equals the centripetal force required to rotate with them. As examples, FIG. 8 depicts Lagrange points relative to an earth-sun system while FIG. 9 depicts corresponding points in an earth-moon system.

Of the five Lagrange points, three are unstable, L1, L2, and L3, and two are stable, L4 and L5. L1 offers an uninterrupted view of the sun and is currently home to the Solar and Heliospheric Observatory Satellite (SOHO). Likewise, L2 is intended to be home to the MAP Satellite. However, as L1 and L2 are unstable on a time scale of approximately 23 days, satellites parked at these points require regular course and altitude corrections.

In contrast, L4 and L5 are home to stable orbits so long as certain conditions are met, for example, the mass ratio between the two large masses must exceed approximately 24.96. This condition is satisfied for both the earth-sun and earth-moon systems and for many other pairs of bodies in the solar system. Thus, since L4 and L5 are conducive to stable motion, they are viewed as being ideal locations for space stations or observational satellites. Accordingly, a need exists for cost efficient systems and/or methods of transferring objects to these stable equilateral Lagrange points. Along those lines, it is desirable to provide a system and/or method for transferring an object such as a spacecraft or space station that furnishes efficient use of fuel or propellant. It is also desirable to provide a transfer system and/or method that is not substantially dependent on significant thrusting or propelling forces, and in other words, has relatively low propellant requirements.

Furthermore, to this day, existing methods have typically focused on orbital and transfer systems that emphasize only the relationship between the earth and the moon, while not placing enough consideration on the possible effects resulting from third bodies. Accordingly, it is also desirable to provide a transfer or orbital system and/or method that considers the effects of third bodies on transfers to one of the stable Lagrange points. Further, it is also desirable to provide an orbital system and/or method that may be implemented on a computer system that is either onboard the spacecraft or satellite, or located in a central controlling area.

It is also desirable to provide a transfer or orbital system and/or method that does not require large propellant-supplied changes in velocity. It is also desirable to provide an orbital system and/or method that may be used for manned and unmanned missions for purposes of placing an object into orbit at one of the stable Lagrange points.

SUMMARY OF THE INVENTION

To address these and other shortcomings of the prior art, it is a feature and advantage of the present invention to provide a transfer system and/or method for transferring an object such as a spacecraft to a stable equilateral Lagrange point such as L4 and L5 through use of a modified weak stability boundary transfer having parameters sufficient to transfer the spacecraft from a first heavenly object or a first heavenly object orbit to a vicinity of a second heavenly object. The modified weak stability boundary transfer allows momentary capture of the spacecraft at a capture point located in the vicinity of the second heavenly object. At this capture point, a maneuver is executed to target the stable Lagrange point utilizing a substantially negligible amount of propellant. As a result of the maneuver, the spacecraft arrives at the stable Lagrange point.

Thus, it is a feature and advantage of the present invention to provide a transfer system and/or method for transferring an object such as a spacecraft or space station that furnishes efficient use of fuel or propellant.

Relatedly, it is a feature and advantage of the present invention to provide a transfer system and/or method that is not substantially dependent on significant thrusting or propelling forces, and in other words, has relatively low propellant requirements.

It is another feature and advantage of the present invention to provide a transfer system and/or method that considers the effects of a transfer to a stable Lagrange point as more than merely a two body problem.

It is still yet another feature and advantage of the present invention to provide a transfer system and/or method that may be implemented on a computer system that is either onboard the spacecraft or satellite, or located in a central controlling area.

It is yet another feature and advantage of the present invention to provide a transfer system and/or method that may be used for manned and unmanned missions for purposes of placing an object into orbit at one of the stable Lagrange points.

The present invention comprises a system and/or method for cislunar travel which substantially reduces the propellant requirements for lunar missions. The present invention also provides transfer systems useful for earth-to-moon and moon-to-earth travel, which do not directly utilize the moon's gravitational field to achieve orbital transfers and can be sustained with relatively low propellant requirements.

The present invention is based, in part, on the discovery that conventional methods and/or transfer systems concentrate or revolve around the relationship between the earth and the moon, and do not consider possible effects and/or uses beyond this two-body problem. More specifically, a new method and system that considers lunar travel and/or capture as at least a three-body problem has been discovered. This at least three-body problem includes the inter-relationship between the earth, moon and sun, including the inter-relationship of gravitational forces related thereto.

In accordance with one embodiment of the invention, a method for transferring a spacecraft from a first heavenly object or a first heavenly object orbit to a stable Lagrange point is disclosed. The method includes performing a modified weak stability boundary transfer with parameters sufficient to transfer the spacecraft from the first heavenly object or the first heavenly object orbit to a vicinity of a second heavenly object, allowing momentary capture of the spacecraft at a capture point located in the vicinity of the second heavenly object, executing a maneuver at the capture point to target the stable Lagrange point utilizing a substantially negligible amount of propellant, and arriving at the stable Lagrange point.

There has thus been outlined, rather broadly, several important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

NOTATIONS AND NOMENCLATURE

Figure 1:
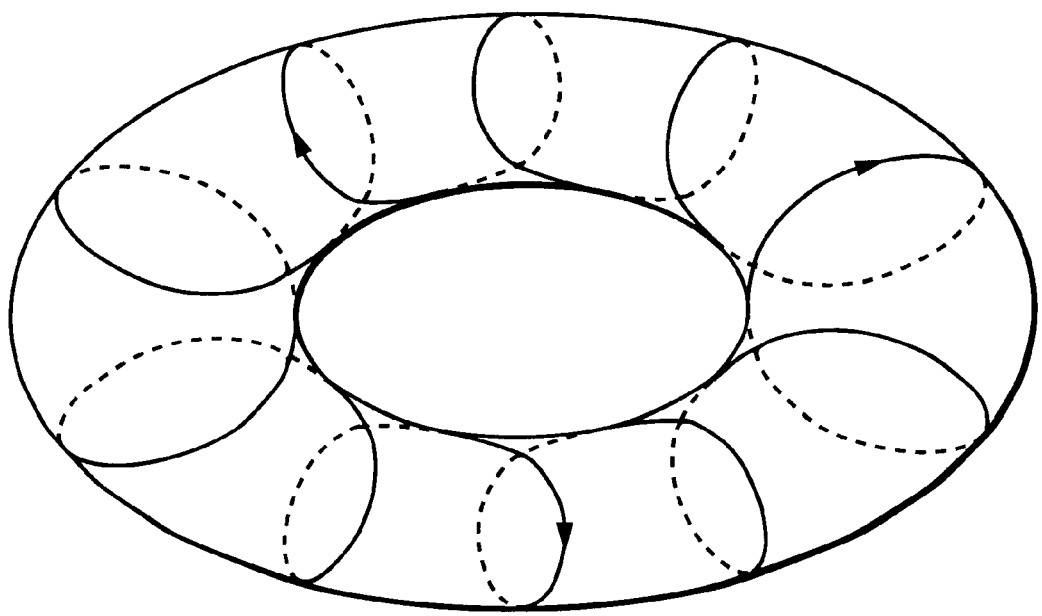
FIG. 1 depicts an integrable system with two degrees of freedom on a torus and a closed orbit of a trajectory.
Figure 2:
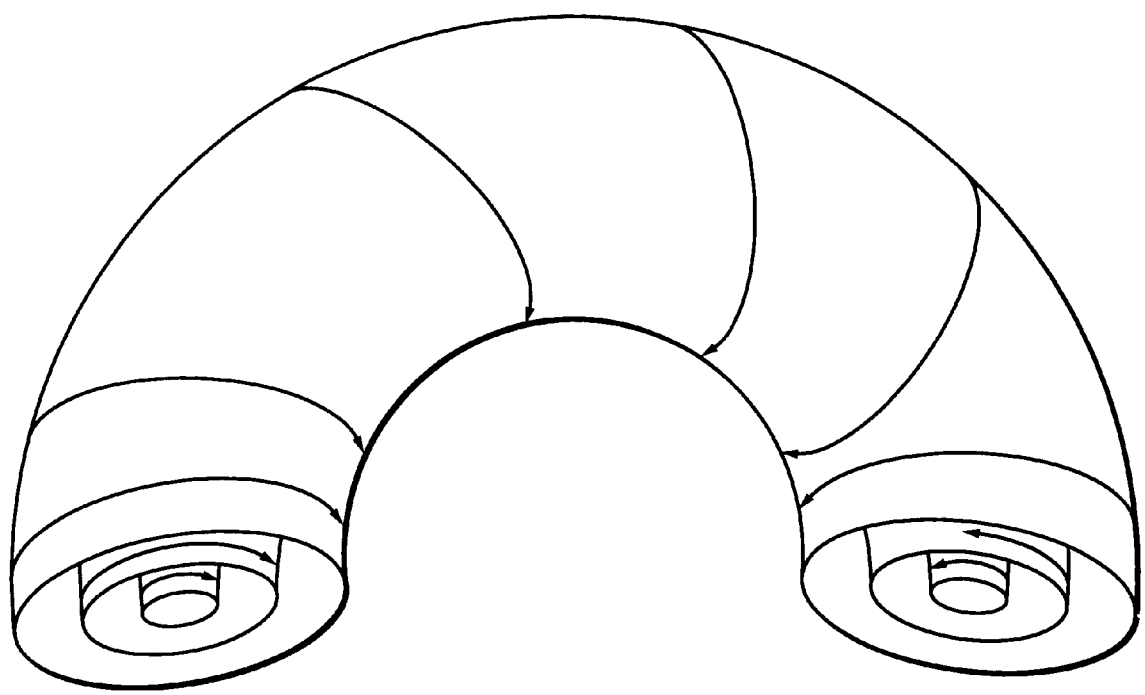
FIG. 2 illustrates a set of KAM invariant tori on the surface of which lie as elliptic integrable solutions.
Figure 3:
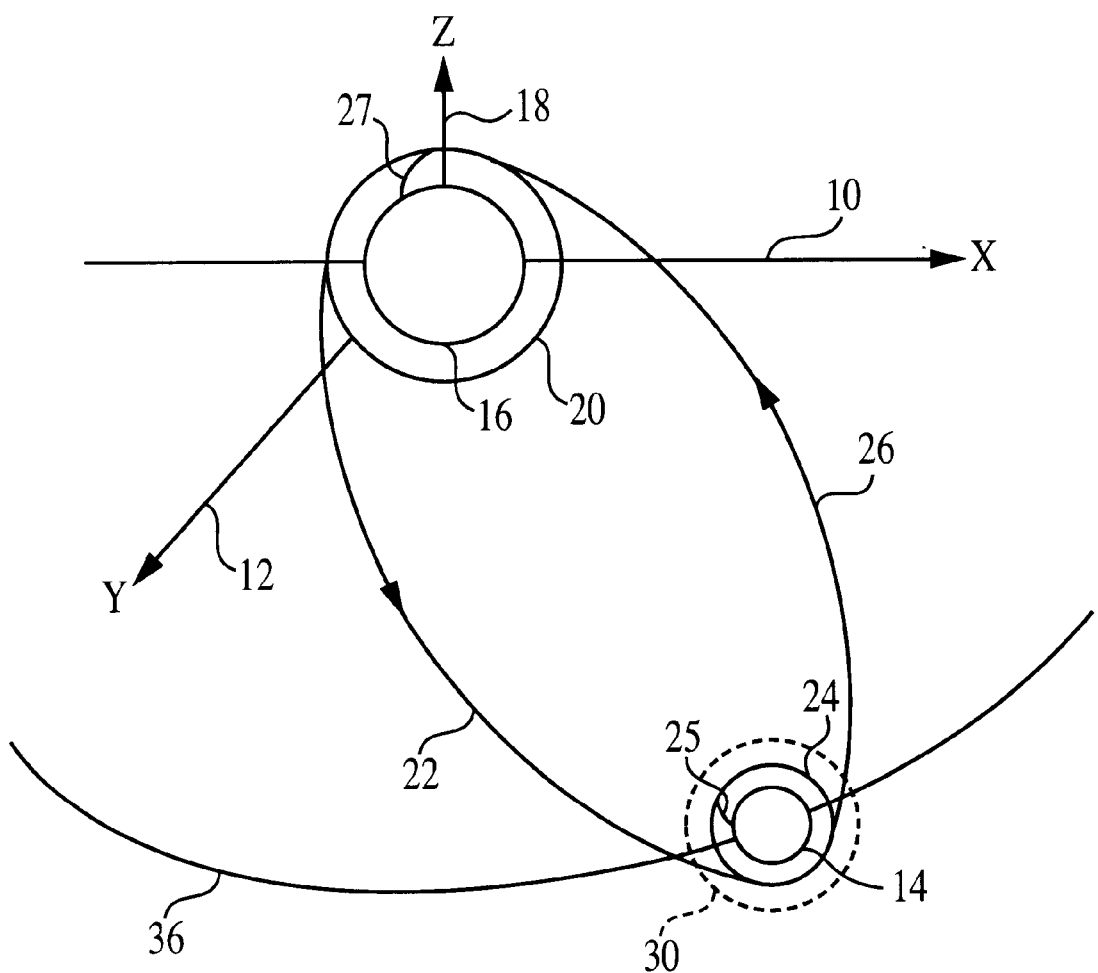
FIG. 3 is an illustration of an orbital system in accordance with a conventional lunar mission in a non-rotating coordinate system.
Figure 4:
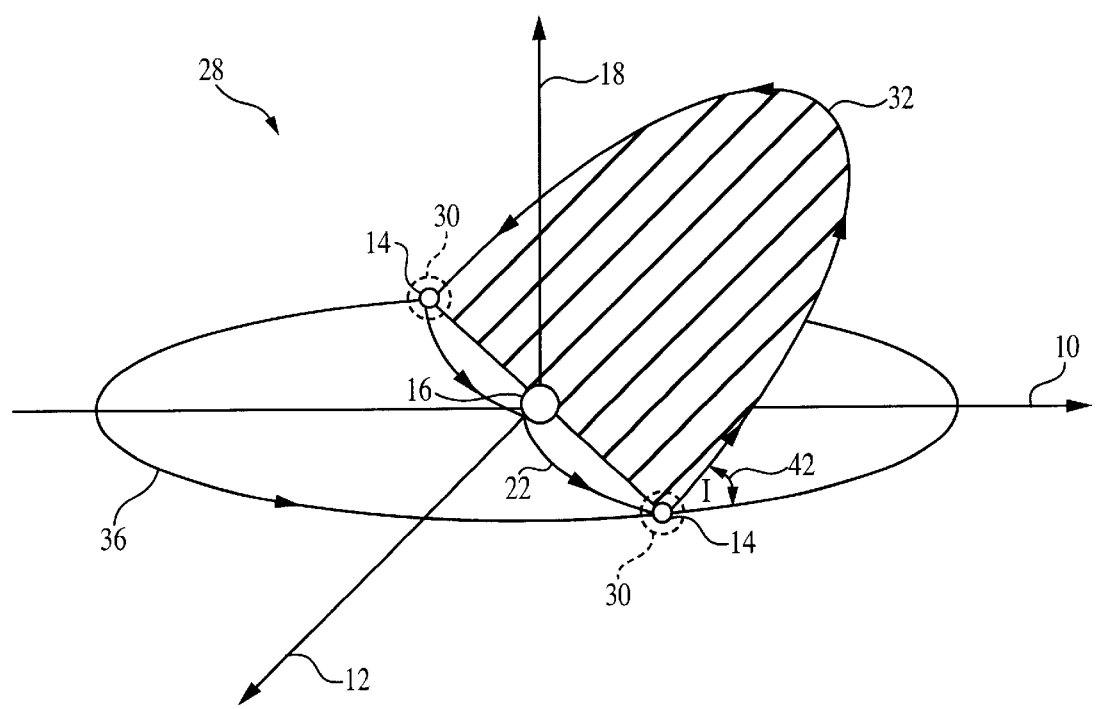
FIG. 4 is an illustration of another conventional orbital system.
Figure 5:
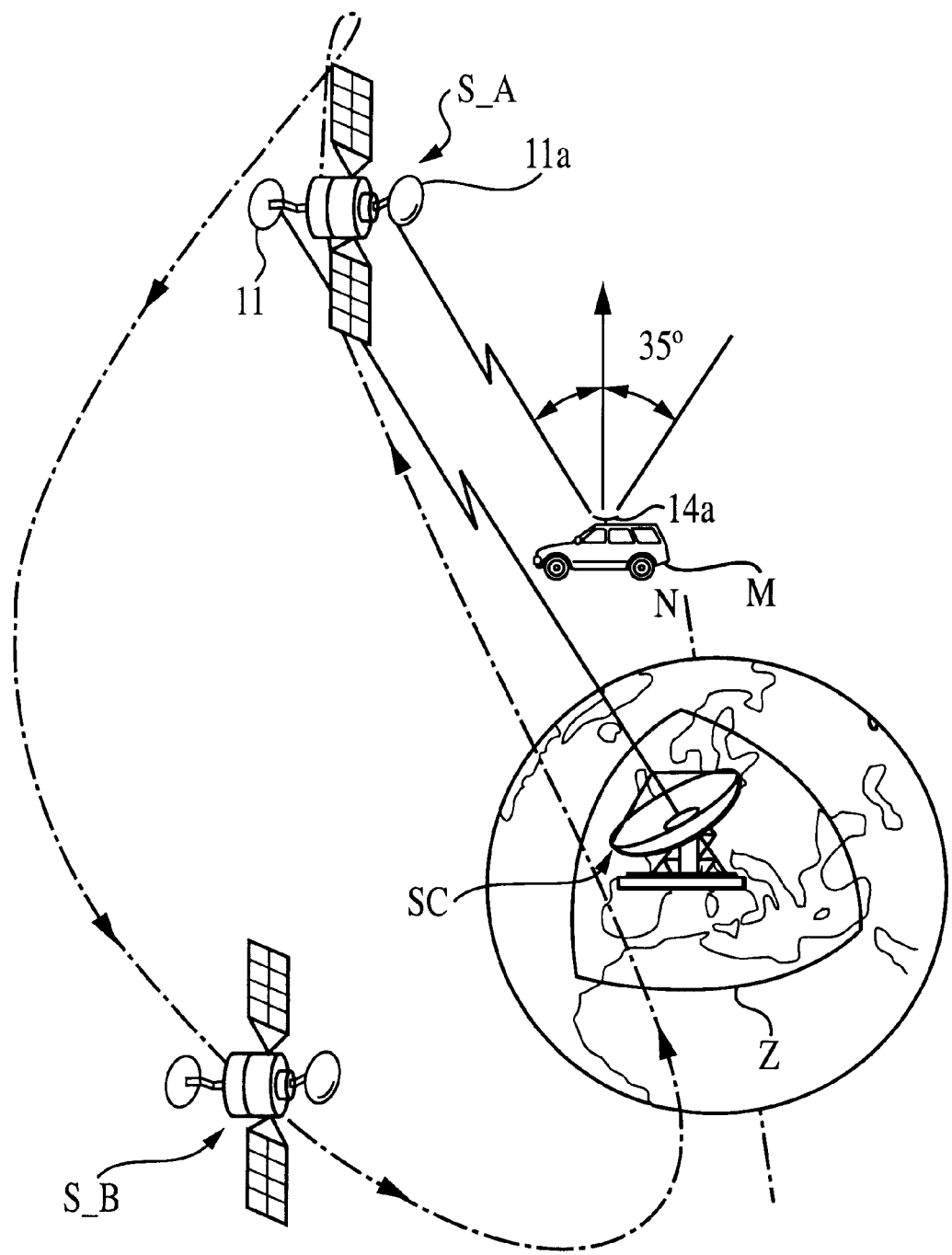
FIG. 5 is an illustration of another orbital system where, for example, satellites orbit the earth.
Figure 6:
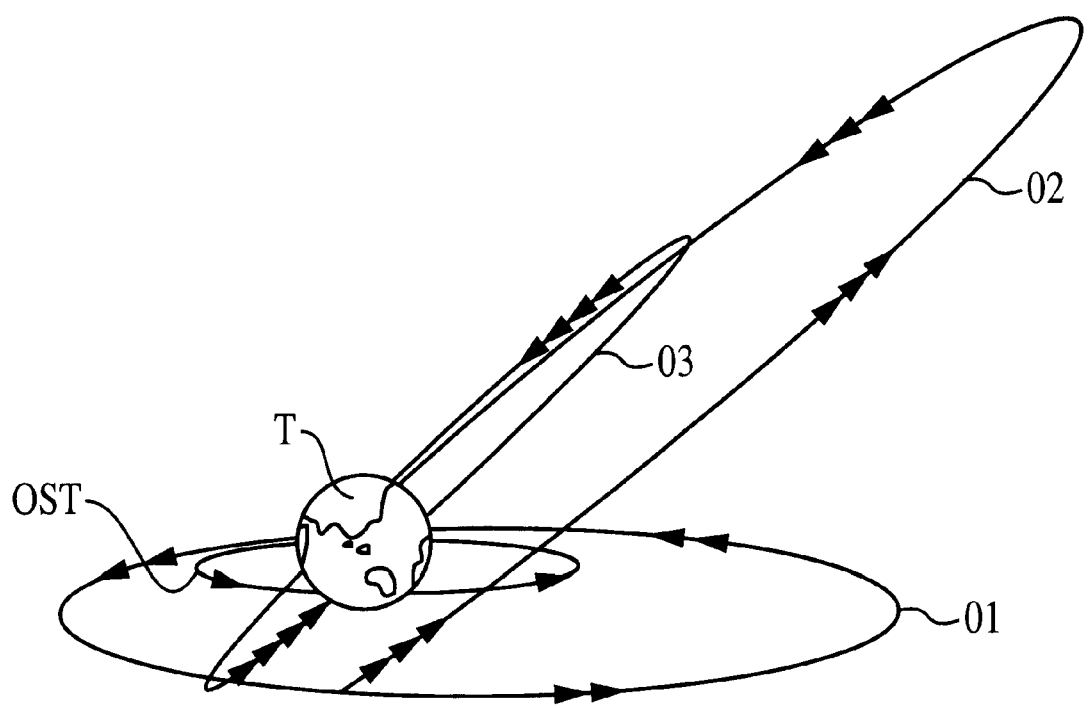
FIG. 6 is an illustration of another orbital system where, for example, satellites are placed in orbit about the earth using the ARIANE IV rocket which requires three pulses.
Figure 7:
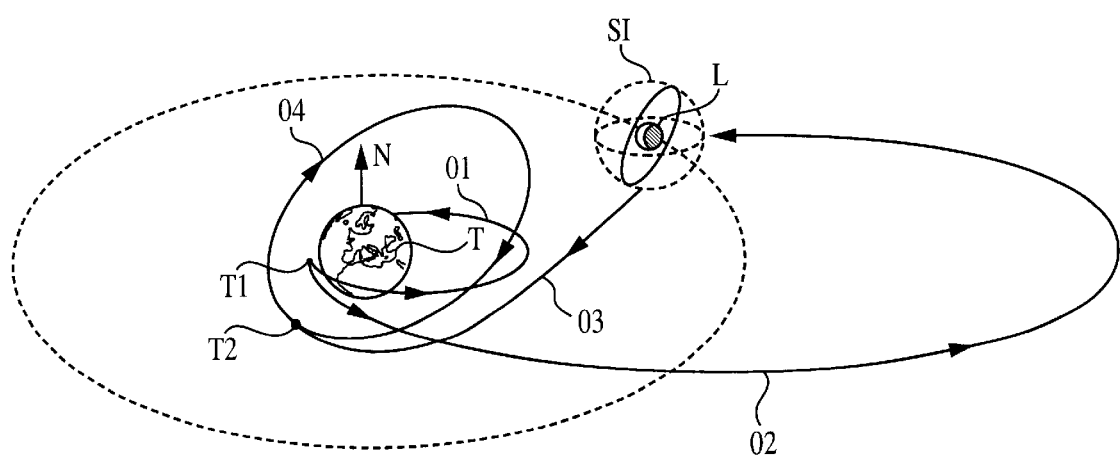
FIG. 7 is an illustration of another conventional lunar gravitational assistance transfer principle.
Figure 8:
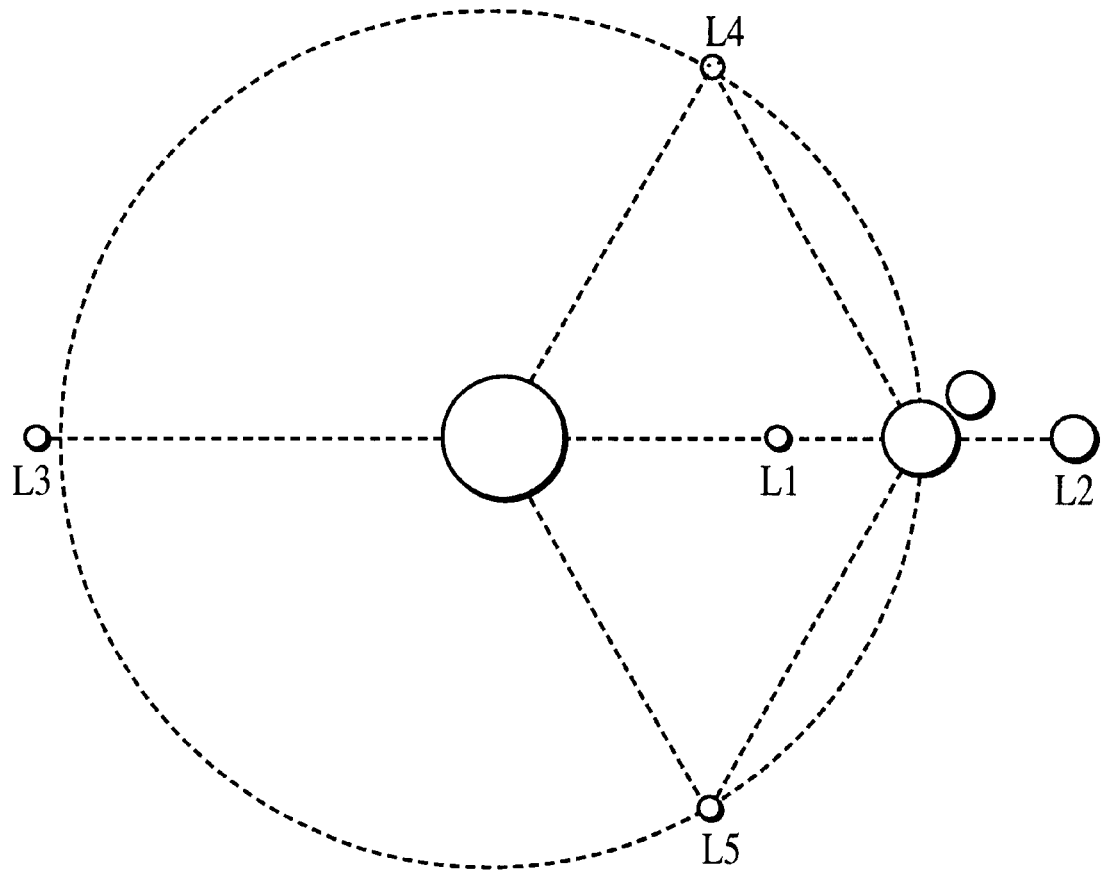
FIG. 8 illustrates a set of Lagrange points in an earth-sun system.
Figure 9:
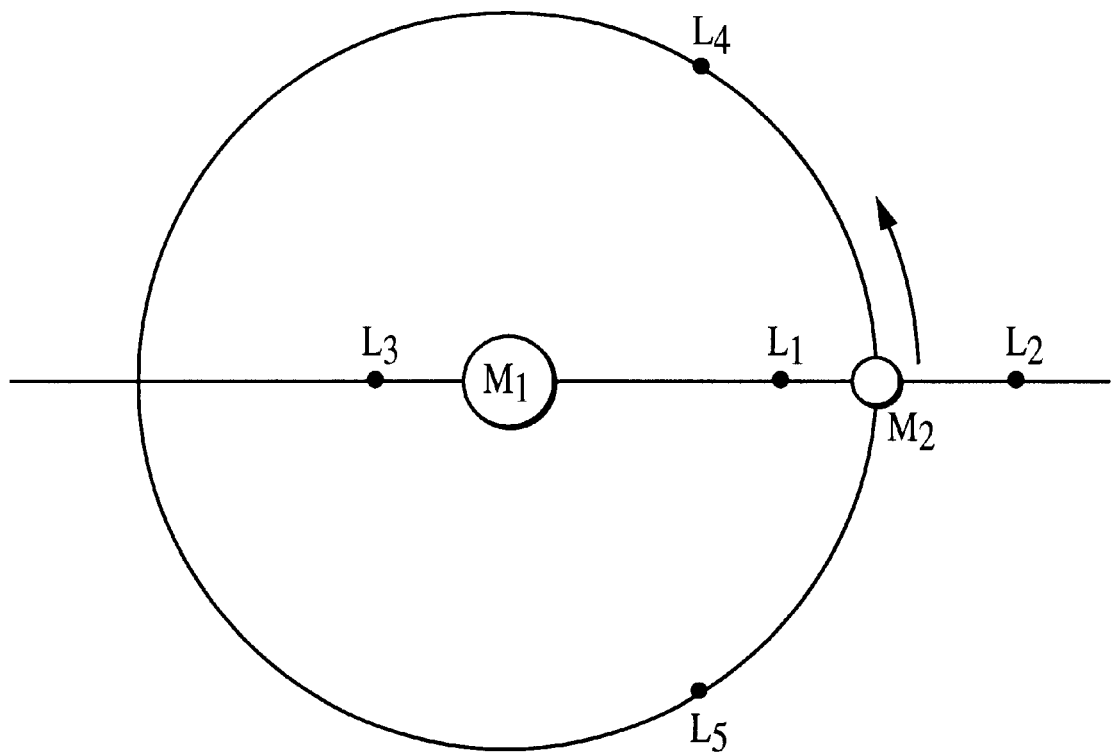
FIG. 9 illustrates a set of Lagrange points in an earth-moon system.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENTS OF THE INVENTION

In accordance with the principles of the present invention, a technique for transferring an object such as a spacecraft or space station to one of the stable Lagrange points is presented herein. Advantageously, the technique of the present invention may be used to transfer an object to an equilateral Lagrange point such as L4 or L5 in a fuel and cost efficient manner. To accomplish such a task, a transfer system not substantially dependent on significant thrusting or propelling forces, and to the contrary has a relatively low propellant requirement, is presented. In addition, the technique of the present invention is implemented with consideration of more than two heavenly bodies on an onboard computer system or in a remotely located central controlling area. To this end, the present invention makes use of a modified weak stability boundary transfer with parameters sufficient to transfer the spacecraft from a first heavenly object or a first heavenly object orbit to a vicinity of a second heavenly object, and to allow momentary capture of the spacecraft at a capture point located in the vicinity of the second heavenly object. Then, a maneuver at the capture point is executed to target the stable Lagrange point utilizing a substantially negligible amount of propellant. Lastly, the spacecraft arrives at the stable Lagrange point.

As mentioned above, the L4, and L5 equilateral Lagrange points in an earth-moon system are ideal locations to place objects, such as, for instance space stations or observational satellites, because they give rise to stable motion. Thus, an object placed in the vicinity of one of these points remains in position for long periods of time measured in, for example, thousands of years. Advantageously, this eliminates the necessity of frequent station keeping and monitoring. As mentioned above, these stable Lagrange points are completely different in nature from the other three Lagrange points L1, L2, L3 which are known to be unstable. That is, an object at rest near one of the unstable points rapidly becomes unstable in motion and moves away from the point in the matter of days.

For the sake of clarity, the examples described below make reference only to L5. Nevertheless, it is to be understood that the techniques of the present invention may be utilized to perform transfers to either of the stable Lagrange points. Furthermore, although the following discussion describes transfers to stable Lagrange points in an earth-moon system, the present invention is not to be construed as being limited only to the earth-moon system. To the contrary, the present techniques are easily implementable in, for instance, earth-sun systems or any other systems having heavenly objects containing suitable amounts of mass.

In one embodiment of the present invention, an object may be transferred to one of the stable Lagrange points via a Hohmann transfer. Generally speaking, a Hohmann transfer is a fuel efficient method for transferring an object from one orbit to another orbit which is located in the same plane (i.e., has the same inclination), but has a different altitude. Because L4 and L5 are approximately at the earth-moon distance, Hohmann transfers to them have properties similar to earth moon transfers. For instance, from low earth orbit at about approximately 100 km altitude, the time of flight is approximately 3–5 days. Upon reaching L4 or L5, a rendevous delta-V of approximately 800 m/s is required. Additionally, the object or spacecraft's transfer is highly eccentric with an eccentricity of approximately 0.97. Furthermore, the maneuver of 800 m/s is typically applied over a time span of several minutes.

In a preferred embodiment of the present invention, a transfer to L4 or L5 requiring negligible maneuvers after earth departure is utilized. By doing so, a substantial savings in fuel or propellant and cost may be realized. In this embodiment, the object arrives at either of the stable Lagrange points where the post earth departure delta-V has been reduced to zero. In this case, the transfer departs from the earth at an altitude of approximately 186 km with approximately the same delta-V as the above described Hohmann transfer. As an example, a process utilizing the JPL planetary ephemeris de403 may be used.

With respect to the preferred embodiment, because of the reduction in rendevous delta-V, an increase of flight time from 3–5 days from the above Hohmann transfer to about 125 days results. However, this increase is well worth the savings in propellant considering the elimination of 800 m/s of rendezvous delta-V.

In accordance with the principles of the present invention, the transfer of the preferred embodiment utilizes, for example, a so-called ballistic lunar capture transfer (BCT), weak stability boundary (WSB) transfer, or fuzzy boundary transfer. This transfer was discovered by Belbruno in 1987 and is described in greater detail in *Lunar Capture Orbits, a Method of Constructing Earth-Moon Trajectories and the Lunar GAS Mission*, by E. Belbruno, AIAA Paper No. 87-1054, Proceedings of the AIAA/DGLR/JSASS Inter. Elec. Propl. Conf., May 1987; and in U.S. patent application Ser. No. 09/277,743, filed on Mar. 29, 1999 by E. Belbruno, both of which are incorporated herein by reference including the references cited therein. As an example of its operability, the BCT or WSB transfer was refined and applied to the operational Japanese spacecraft Hiten in 1991 enabling it to reach the moon on Oct. 2, 1991 with little propellant. Details on this mission can be found in *Examples of the Nonlinear Dynamics of Ballistic Capture in the Earth-Moon System*, by E. Belbruno, AIAA Paper No. 90-2896, Proceedings of the Annual AIAA Astrodynamics Conf., August 1990; *Through the Fuzzy Boundary: A New Route to the Moon*, by E. Belbruno, The Planetary Report, V. XII, No. 3, pp. 8–10, May/June 1992; and *Gravity's Rim: Riding Chaos to the Moon*, by A. Frank, Discover, September 1994, pp. 74–79, all of which are incorporated herein by reference including the references cited therein.

Advantageously, the WSB transfer enables the spacecraft to become captured by the moon ballistically; that is, with no propellant. It does this by arriving at the moon in a dynamically sensitive region where the object or spacecraft, as it moves, feels or is affected by the gravitational perturbations of the earth, and moon almost equally, and where it has an elliptic state with respect to the moon. This region, as alluded to above, is called the WSB and completely surrounds the moon in the six-dimensional position-velocity space. It is five-dimensional, and contains the unstable collinear Lagrange points as special degenerate values. See, e.g., Belbruno, *Lunar Capture Orbits, a Method of Constructing Earth-Moon Trajectories and the Lunar GAS Mission*; Frank, *Gravity's Rim: Riding Chaos to the Moon*; and *The Dynamical Mechanism of Ballistic Capture Transfers in the Four-Body Problem from the Perspective of Invariant Manifolds and Hill's Regions*, by E. Belbruno, Centre De Recerca Mathematics (CRM), Preprint No. 270, December 1994, which is also incorporated herein by reference including the references cited therein.

In the present invention the object or spacecraft is captured in an unstable manner. As such, a tiny amount of delta-V is applied to stabilize the object, in the order of approximately 20 m/s, otherwise in a matter of a few hours the object can possibly be ejected from the moon. The use of only of a small amount of delta-V for stabilization makes it attractive for numerous practical applications. In the preferred embodiment, a WSB transfer leaves the earth with approximately the same delta-V as with the Hohmann transfer of the former embodiment—for example, at an altitude of approximately 200 km, and at approximately 10.98 km/s. Afterwards, however, the two transfers are substantially different. For example, at a lunar capture periapsis altitude of approximately 100 km, the WSB transfer arrives with an eccentricity of approximately 0.94, while the Hohmann transfer has a hyperbolic excess velocity of approximately 1 km/s. Additionally, relative to going into a circular orbit, the WSB transfer requires 30% less propellant. Furthermore, the WSB transfer has a longer flight time of about 90 days as compared to 3–5 days for a Hohmann transfer. Also, the WSB goes out to approximately 1.5 million km from the earth, before returning to lunar capture.

The sun's perturbation plays a key role in the dynamics of the transfers of the present invention. In the approximately 1.5 months that it takes the WSB transfer to reach the moon from its earth apoapsis, the sun's gravitational pull actually slows the object down, so the spacecraft can arrive with a suitable velocity to be ballistically captured at the WSB. The effect of the sun is to lower the energy of the spacecraft with respect to the moon.

In accordance with the principles of the present invention, the WSB transfer is determined in a straight forward manner using numerical targeting algorithms, as described in *Ballistic Capture Lunar Transfer Determination for the U.S. Airforce Academy Blue Moon Mission*, by E. Belbruno, AAS Paper No. 97-171, Proceedings of the AAS/AIAA Space Flight Mechanics Meeting, Feb. 10–11, 1997, which is incorporated herein by reference including the references cited therein. In particular, a forward 2×2 Newton's algorithm is used. That is, a search using two control and two target variables. Furthermore, it is noted that although it seems that a WSB transfer is more sensitive than a Hohmann transfer, this sensitivity is more advantageous for missions. For example, unlike a Hohmann transfer which must perform a very large maneuver in a matter of seconds at the moon to be captured, the WSB transfer of the present invention utilizes a tiny stabilization maneuver which can be applied over a period of several days if required. Also, the sensitivity in general yields tiny maneuvers for orbital maintenance. See, *On Making Use of Lunar and Solar Gravity Assists in Lunar-A and Planet-B Missions*, by H. Yamakowa, Acta. Astr., V. 35, pp. 633–642, 1995, for an example of a WSB transfer used by Japan in 1999 for the Lunar-A mission, which is incorporated herein by reference including the references cited therein.

Figure 10:
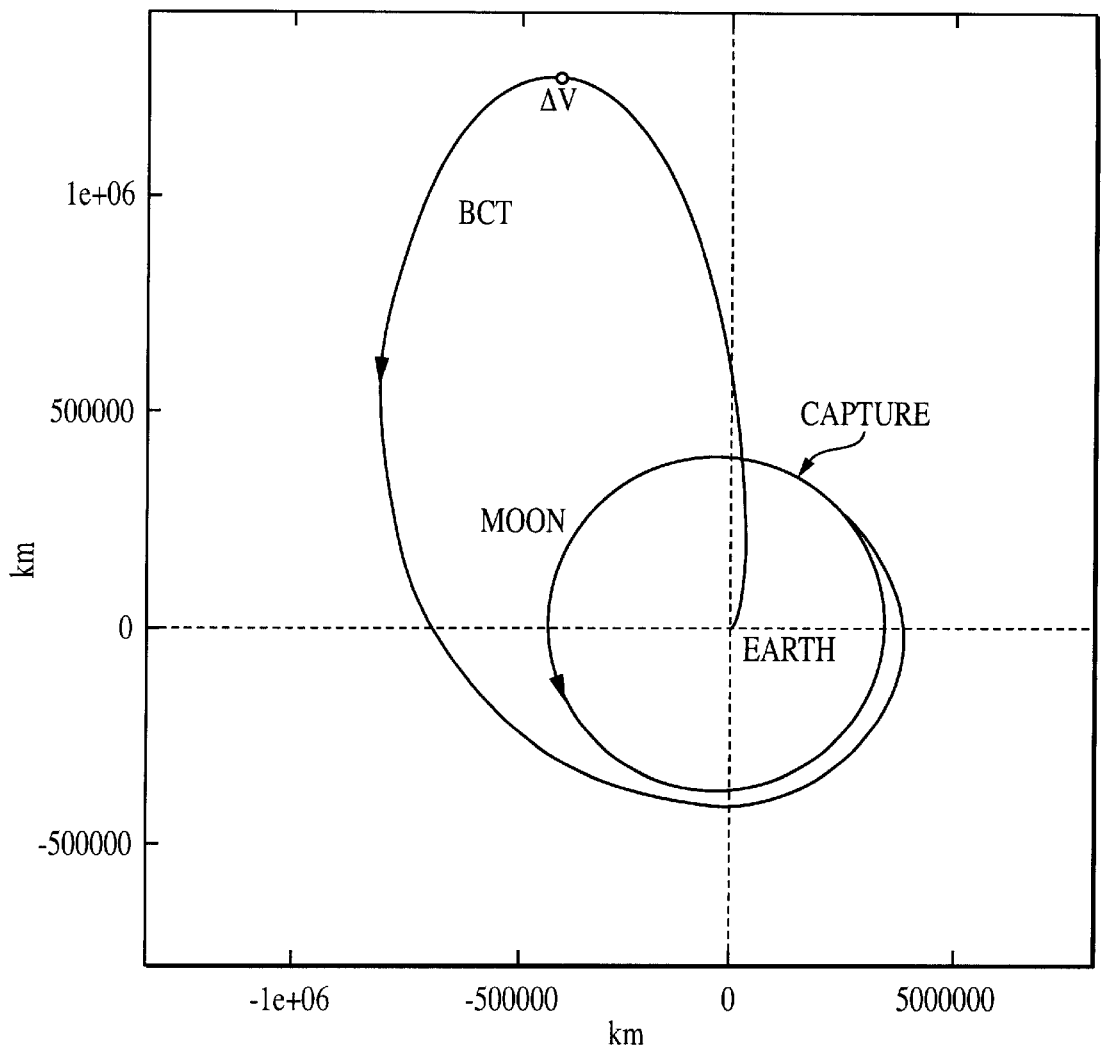
FIG. 10 depicts one example of a weak stability boundary transfer in an earth centered coordinate system in accordance with the principles of the present invention.

In accordance with one embodiment of the present invention, FIG. 10 illustrates one example of a plot of the WSB transfer described above. Specifically, FIG. 10 represents an inertial earth centered coordinate system with the following parameters: earth departure of Jul. 16, 1997, at an altitude of 200 km and an inclination of 7 degrees; lunar arrival of Oct. 19, 1997, at lunar periapsis at an altitude of 500 km with an eccentricity of 0.97 and an inclination of 90 degrees; and suitable for an Arianne launch vehicle. See, *The Dynamical Mechanism of Ballistic Capture Transfers in the Four-Body Problem from the Perspective of Invariant Manifolds and Hill's Regions*, Belbruno, for a discussion on some of the theoretical issues connected with the motion of this transfer. As a further example, the parameters discussed above are similar to those used in the Blue Moon mission. Using these parameters, as an example, results in a WSB with a flexible launch period.

In accordance with a preferred embodiment of the present invention, a modified WSB is utilized to determine a ballistic capture transfer to L5. In this regard, instead of arriving at a given altitude at lunar periapsis with ballistic capture, the altitude is raised or increased so that the capture is as weak as possible. As a result, the spacecraft is only elliptic for a short period of time and travels by the moon at a slightly reduced velocity. The spacecraft can then be carefully targeted at lunar periapsis, with a small maneuver or delta-V of approximately 35 m/s to complete the transfer to L5. Advantageously, this small maneuver requires little or substantially negligible amounts of propellant.

Upon arrival to a neighborhood or vicinity of L5, the object starts to cycle around L5 in an unstable fashion. At this point, a small delta-V can be utilized to stabilize the object's motion. The flight time of the modified WSB transfer of this embodiment is approximately 89 days. In comparison, the time of flight taken to travel from the termination of the WSB transfer at lunar periapsis to the desired neighborhood of L5 takes approximately 46 days. Therefore, the total time of flight is approximately 135 days.

After performing the small maneuver and traveling the post-WSB transfer leg of the journey, the spacecraft arrives at a distance of approximately 50,000 km from L5. The spacecraft then starts to cycle about L5, but is pulled away. In accordance with the principles of the present invention, a delta-V of approximately 40 m/s is utilized to lower the altitude and stabilize the capture. As discussed above, the reason stabilization is possible is because motion about L5 or L4 in general is stable. See, *Laser Interferometer Gravity Wave Antenna in Space*, R. W. Hellings, and E. Belbruno, JPL D-9908, FY 92 Final Report, July 1992; *Lectures in Celestial Mechanics*, C. L. Siegel and J. Moser, Springer Verlag, GTM, 1971; *Station Keeping of Libration Point Orbits*, C. Simo et al., Final Report, ESA Contract Report 5648/83/D/JS, Barcelona, November 1985; and *Theory of Orbits*, V. Szebehely, Prentice Hall, 1967, all of which are incorporated herein by reference including references cited therein. This motion about L4 or L5 may be approximated by uniform elliptic motion and is referred to as Lyapunov orbits. By arriving near L5, a small maneuver can optionally be performed to place the spacecraft near these stable elliptical orbits at the desired altitude.

Adding the delta-V's used in this embodiment from the targeting delta-V at the lunar periapsis of the WSB transfer together with the L5 stabilization delta-V results in approximately 75 m/s. Additionally, these maneuvers could probably be reduced to nearly zero with variation of the parameters. This total delta-V is substantially less than the approximately 823 m/s required by the above described Hohmann transfer for rendezvous with L5. Thus, the preferred embodiment results in a savings of 91%. If the small maneuvers are eliminated, the savings approach 100%.

The transfers presented herein are only an example of a large set of such transfers with different parameters. Some of these may be more desirable than others, depending on the mission. The ability to send payloads ballistically to L4 or L5 is desirable for the Slingatron (*Slingatron Launch of*

Materials into Space, D. Tidman, Ad Astra, 1996, incorporated herein by reference including the references cited therein) where the mass should be reduced as much as possible. Advantageously, the low energy requirements of the transfers of the present invention reduce propellant required by prior art methods for transferring to L4, or L5. Further, substantial reduction of this propellant yields substantial reduction of the payload mass depending on the mass fractions.

Referring to FIG. 10, the WSB transfer of one embodiment of the present invention is now discussed in greater detail. As depicted in FIG. 10, an object such as a spacecraft arrives at the moon at an altitude of 500 km at a periapsis with an osculating eccentricity of 0.97. In addition, its flight time is approximately 94 days. With respect to FIG. 10, where T represents epoch; rE represents the radius or radial distance with respect to earth; hE represents altitude with respect to earth; VE represents the velocity magnitude with respect to earth; aE represents the semi-major axis with respect to earth; iE represents the inclination with respect to earth; eE represents the eccentricity with respect to earth; gE represents the flight path angle with respect to earth; DV=Delta-V; and FT=Flight time (the same set of symbols with the letter M in place of E represents parameters with respect to the moon) the following parameters are utilized:

1. Earth Injection (Departure)
T: Jul. 16, 1997 06:17:48 (ET)
hE=200 km, VE=10.98 km/s, iE=7 degrees.
2. Apoapsis
T: Aug. 22, 1997 11:48:08
rE=1,370,923 km, VE=0.215 km, DV=4.6 m/s.
3. Lunar Capture
T: Oct. 9, 1997 06:52:47
hM=500 km, VM=2.08 km/s, aM=84,217 km, eM=0.97, iM=90 degrees.
TF=94 days For purposes of this discussion, the above transfer is referred to as WSB1. In accordance with a preferred embodiment of the present invention, WSB1 is modified by significantly increasing its lunar capture altitude at the moon from 500 km. This involves a retargeting of WSB1 by variation of VE, gE and using these as control variables to target to rM, and iM. Symbolically, this targeted Newton's search is written as:

$$VE, gE \rightarrow rM, iM.$$

This procedure is described in greater detail in *Ballistic Capture Lunar Transfer Determination for the U.S. Airforce Academy Blue Moon Mission*, by E. Belbruno, AAS Paper No. 97-171, Proceedings of the AAS/AIAA Space Flight Mechanics Meeting, Feb. 10–11, 1997, and in U.S. patent application Ser. No. 09/277,743, filed on Mar. 29, 1999 by E. Belbruno, both of which, as mentioned above, are incorporated herein by reference including the references cited therein. Further description made be found in U.S. Provisional Patent Application No. 60/036,864, filed on Feb. 4, 1997, by E. Belbruno, and in U.S. patent application Ser. No. 09/306,793, filed on May 7, 1999 by E. Belbruno, both of which, as mentioned above, are also incorporated herein by reference including the references cited therein.

This search preserves the values of the node and inclination at earth. In addition, there is a slight variation of the argument of periapsis. The values targeted to are rM=141, 277 km, and iM=0 degrees. At the end of the search, this value of rM was obtained, however, it was necessary to increase iM to 144.0 degrees to cause convergence. eM=0.348 was obtained where TF=89 days. This high radius of capture was chosen to obtain a very weak capture as previously described.

Figure 11:
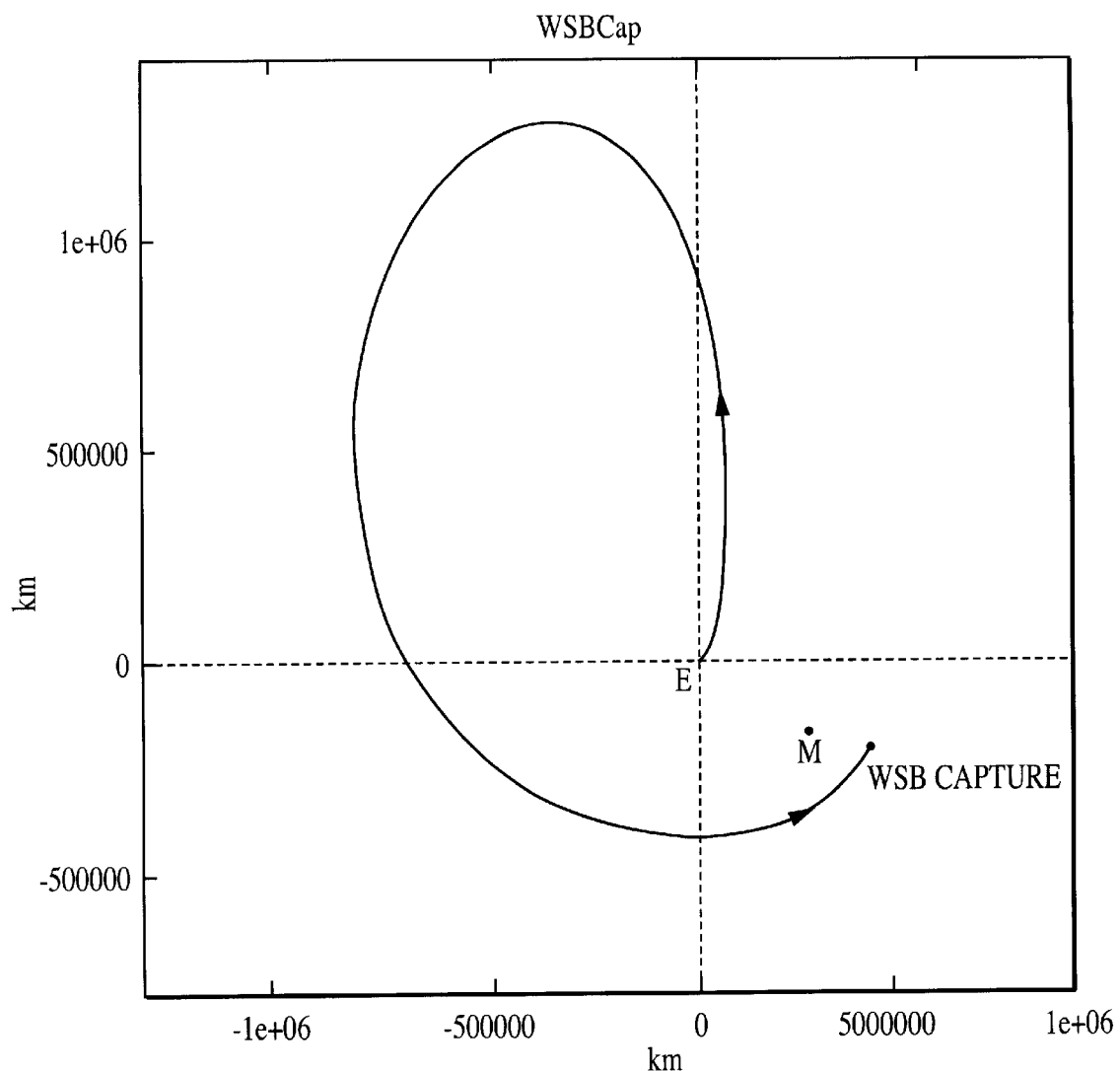
FIG. 11 depicts one example of a modified weak stability boundary transfer in an earth centered coordinate system in accordance with the principles of the present invention.
Figure 12:
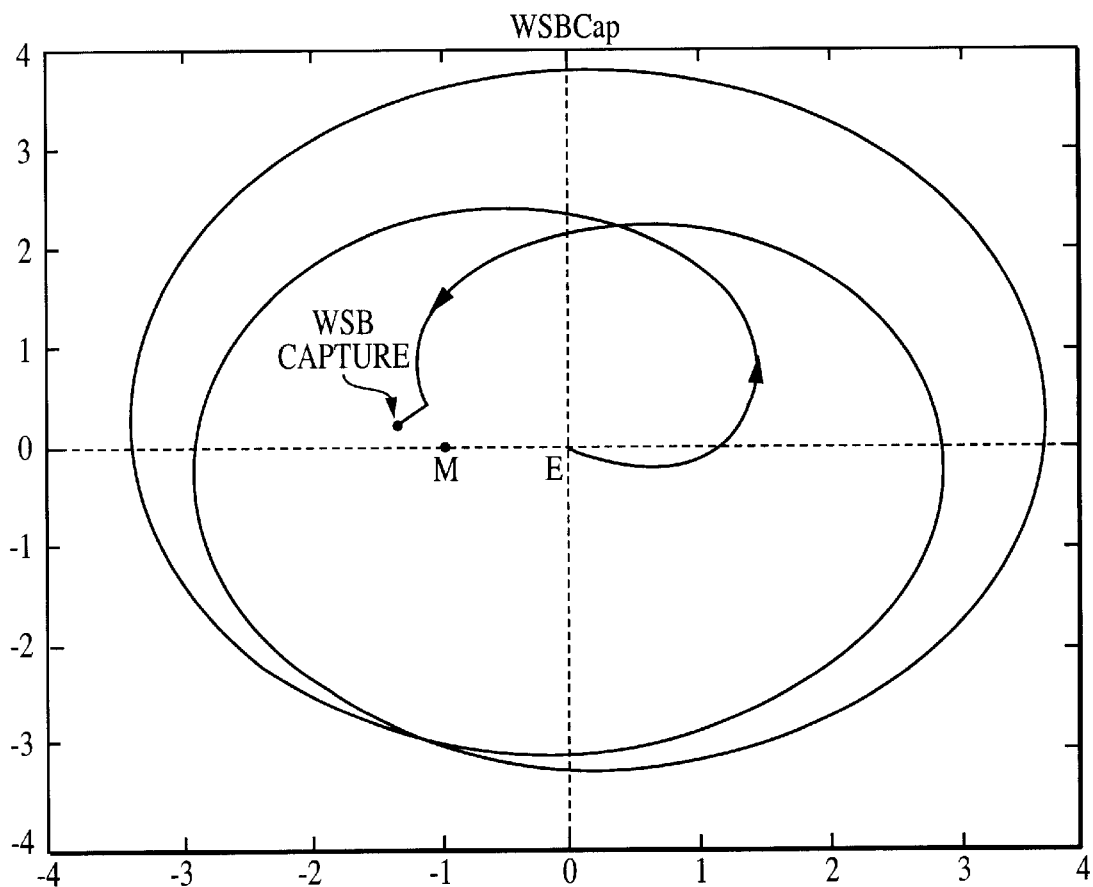
FIG. 12 depicts another example of a modified weak stability boundary transfer in a rotating coordinate system in accordance with the principles of the present invention.

For purposes of this discussion, the new capture transfer of the preferred embodiment is referred to as WSB2. As one example, FIG. 11 depicts the WSB2 transfer of this embodiment in inertial coordinates. Similarly, FIG. 12 depicts the WSB2 transfer in a rotating coordinate system where the earth and moon are both fixed. With respect to FIG. 11, the following parameters and details are noted: Ballistic Lunar Capture Transfer; Ecliptic projection (EMO2000); inertial earth centered coordinate system; orbit of the moon not shown; x-axis points to vernal equinox of the year 2000; earth departure Jul. 14, 1997; lunar arrival Oct. 17, 1997 in a captured elliptic state at lunar periapsis; departs earth from an altitude of 186 km, and arrives at moon at an altitude of 139,539 km, eccentricity of 0.35; and there are no maneuvers. With respect to FIG. 12, the following details and parameters are noted: Ballistic Lunar Capture Transfer; substantially the same as FIG. 11 except the coordinate system is uniformly rotating and the x-axis passes through the earth, moon which are fixed on it; one unit of distance= earth-moon mean distance of 384,000 km; origin earth, moon at x=−1.

As with WSB1, and WSB transfers in general, the captures generally take place near the anti-earth-moon line from the moon. The WSB2 transfer of the preferred embodiment of the present invention is now described. Initially, the value of iE was increased to facilitate convergence.

1. Earth Injection (Departure)
T: Jul. 14, 1997 19:57:43
hE=186 km, VE=10.993 km/s, iE=21.56 degrees.
2. Apoapsis
T: Aug. 21, 1997 04:59:00
rE=1,378,035 km, VE=212 m/s, DV=0
3. Lunar Capture
T: Oct. 12, 1997 08:25:46
rM=141,277 km, VM=150 km/s, em=0.348 km, iM=144 degrees.

Lunar capture is at lunar periapsis. TF=89 days 12 hours.

The WSB transfers represent the first part of the L5 transfer. In addition, it should also be noted that the WSB transfers of the present invention advantageously have flexible launch times. Further, if an object utilizing a WSB1 transfer were allowed to fly to the moon, it would pass far beyond L5. If it did fly near L5 it would do so with a high relative velocity. It is recalled that L5 is located at the position in the earth-moon plane midway between the earthmoon, relative to the earth-moon line, and at a distance of approximately 379,484 km from both the earth and moon, being a vertex of an equilateral triangle. It is assumed that the mean earth-moon distance is 384,000 km. As the moon moves about the earth, the L5 point keeps its relative position with respect to the earth and moon by moving about the earth with a velocity of approximately 1.011 km/s.

Figure 13:
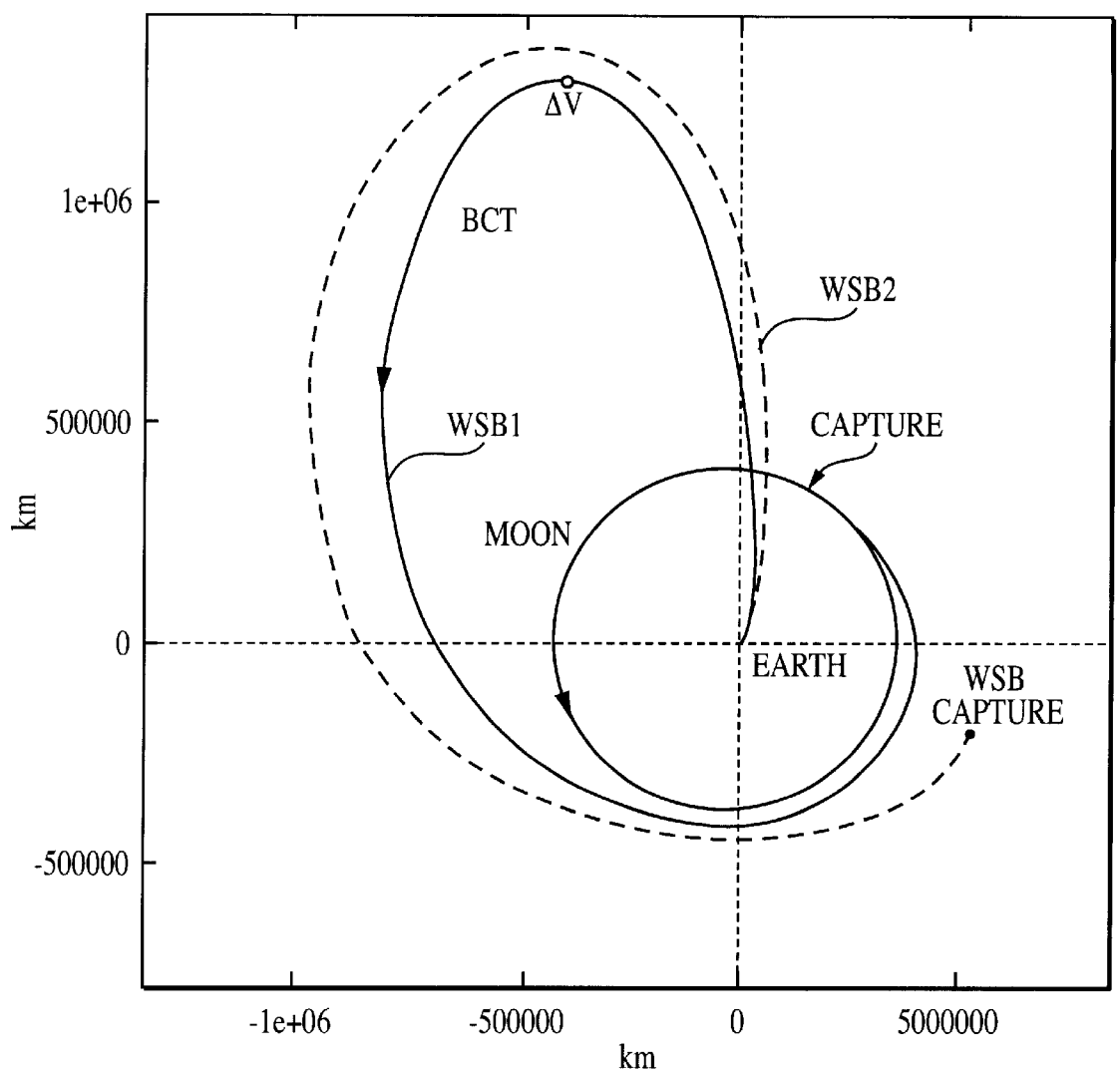
FIG. 13 depicts the transfer of FIG. 11 in conjunction with the transfer of FIG. 12.

Referring to FIG. 13, WSB1 and WSB2 are plotted together in an inertial earth centered coordinate system to allow comparison between the two transfers.

Figure 14:
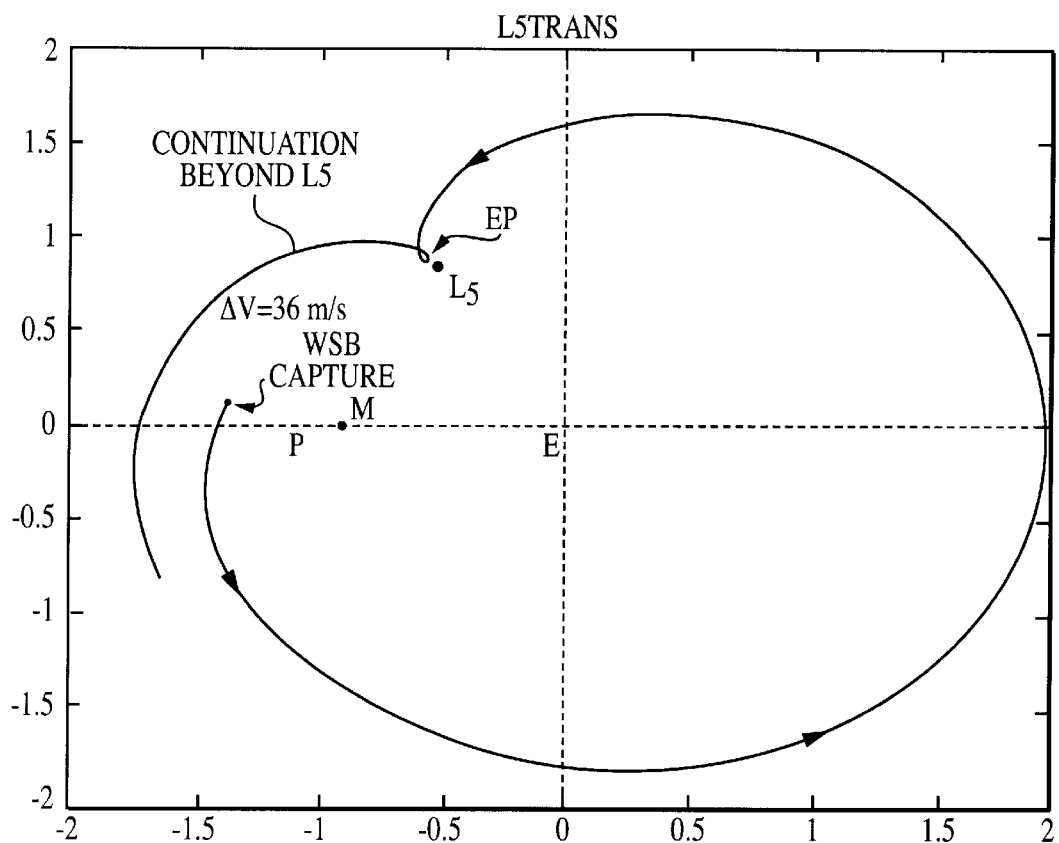
FIG. 14 depicts one example of a trajectory from a capture point to one of the stable Lagrange points in a rotating coordinate system in accordance with the principles of the present invention.

FIG. 14 illustrates another rotating coordinate system in accordance with the present invention and depicts the location of L5. L4, on the other hand, is on the symmetric position relative to the x-axis. In addition, FIG. 14 depicts the continuation of a trajectory from an end point of ballistic lunar capture transfer at lunar periapsis to a vicinity of L5

In accordance with the principles of the present invention, a small maneuver is performed at the capture point P of the WSB2 transfer at lunar periapsis to target the trajectory of L5. Advantageously, because of the sensitivity at P, the maneuver is relatively small and is in the neighborhood of approximately 35 m/s. Referring to FIG. 14, the small loop has an earth periapsis on, for example, Nov. 27, 1997, where the object or spacecraft is traveling only approximately 85 m/s with respect to L5, which, in turn, is approximately 50,041 km away.

For purposes of this discussion, the maneuver at P is referred to as DVP. In turn, DVP is performed to reduce the velocity of the spacecraft. Thus, the norm of the velocity vector at P, which is orthogonal to the radial direction from the moon, is reduced. This norm or vector, VCAP, is 150.414 m/s. The unitized direction of this vector is referred to as u. Thus, the maneuver is given by $$DVP*u,$$

where u is a vector and DVP is a scalar, being the magnitude of the maneuver. The resulting new velocity direction V at P to then propagate from is $$V=VCAP-DVP*u.$$

It is found that by gradually increasing DVP, and propagating forward from P, the spacecraft passes gradually closer to L5. As an example, a value of 35 m/s gives an optimal result where the magnitude of the flyby velocity, VFB, to L5 in the rotating coordinate system is given by; approximately:

$$VFB=26 \text{ m/s}.$$

This occurs at earth periapsis of a distance approximately 429,525 km on for example, Nov. 27, 1997 14 hr 27 min, which is approximately 50,041 km from L5. Referring to FIG. 14, this is shown as the periapsis point of the small loop in the trajectory near L5. The time this occurs is approximately 46 days 6 hours after WSB capture at P. After WSB flyby, the trajectory, called the L5 transfer segment, is an ellipse about the earth of eccentricity eE=0.322 and aE=633, 617 km. The earth periapsis point at L5 closest approach is labeled EP in FIG. 14. A small maneuver may optionally be performed at EP to place the spacecraft in orbit about L5, or to transfer to a closer distance to L5 to orbit.

Figure 15:
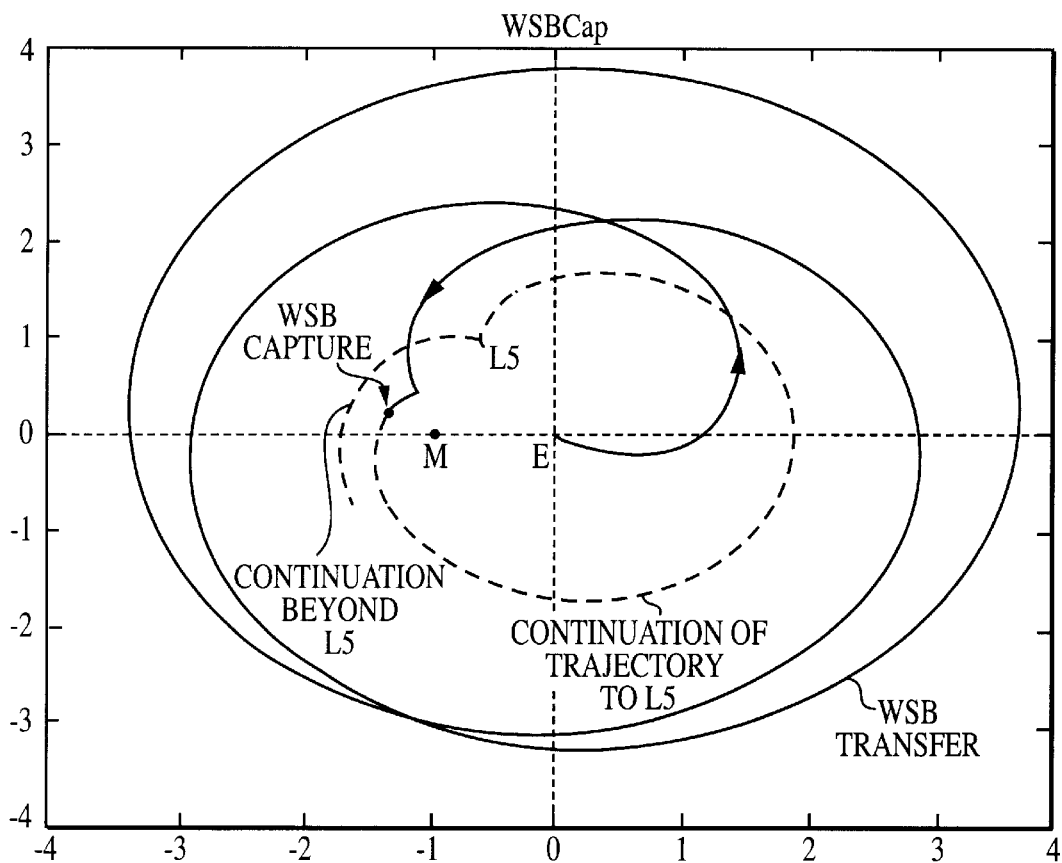
FIG. 15 depicts one example of the transfer of FIG. 12 in conjunction with the trajectory to the stable Lagrange point as shown in FIG. 14.

Referring to FIG. 15, the continuation of the trajectory from the end point of the ballistic lunar capture transfer at lunar periapsis to L5 is depicted. In addition, the illustration in FIG. 15 also depicts, for example, the continuation of the spacecraft beyond L5

Figure 16:
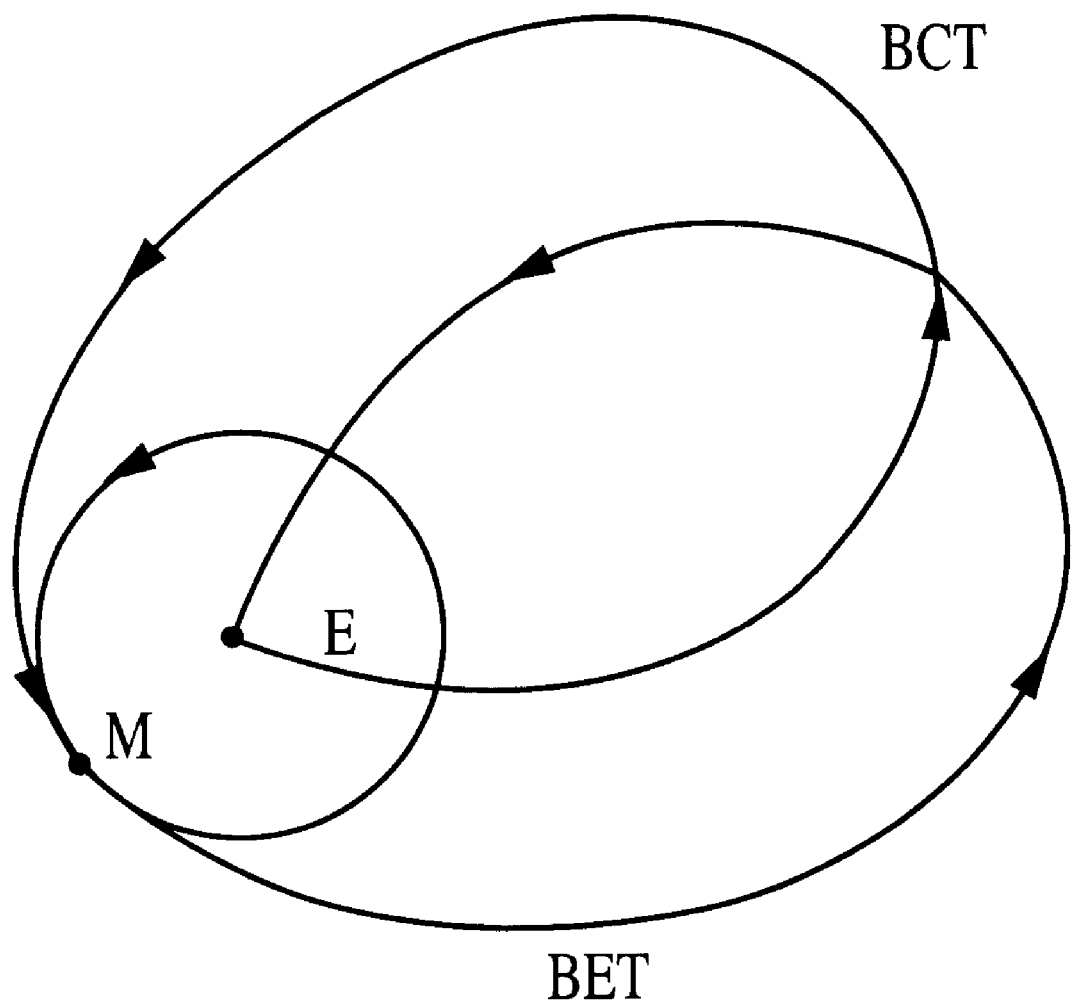
FIG. 16 depicts one example of ballistic ejection transfer which transfers an object back to earth from a weak stability boundary to any desired altitude and inclination.

As shown in FIG. 16, after the spacecraft arrives at the capture point, a negligible delta-V can optionally be utilized to cause the spacecraft to return to earth. This reverse BCT, or Ballistic Ejection Transfer (BET), transfers the spacecraft back to the earth from the WSB to any desired altitude and inclination. The specifics of this procedure are disclosed in U.S. Provisional Patent Application No. 60/036,864, filed on Feb. 4, 1997, by E. Belbruno, and in U.S. patent application Ser. No. 09/306,793, filed on May 7, 1999 by E. Belbruno, both of which, as mentioned above, are incorporated herein by reference including the references cited therein.

Figure 17:
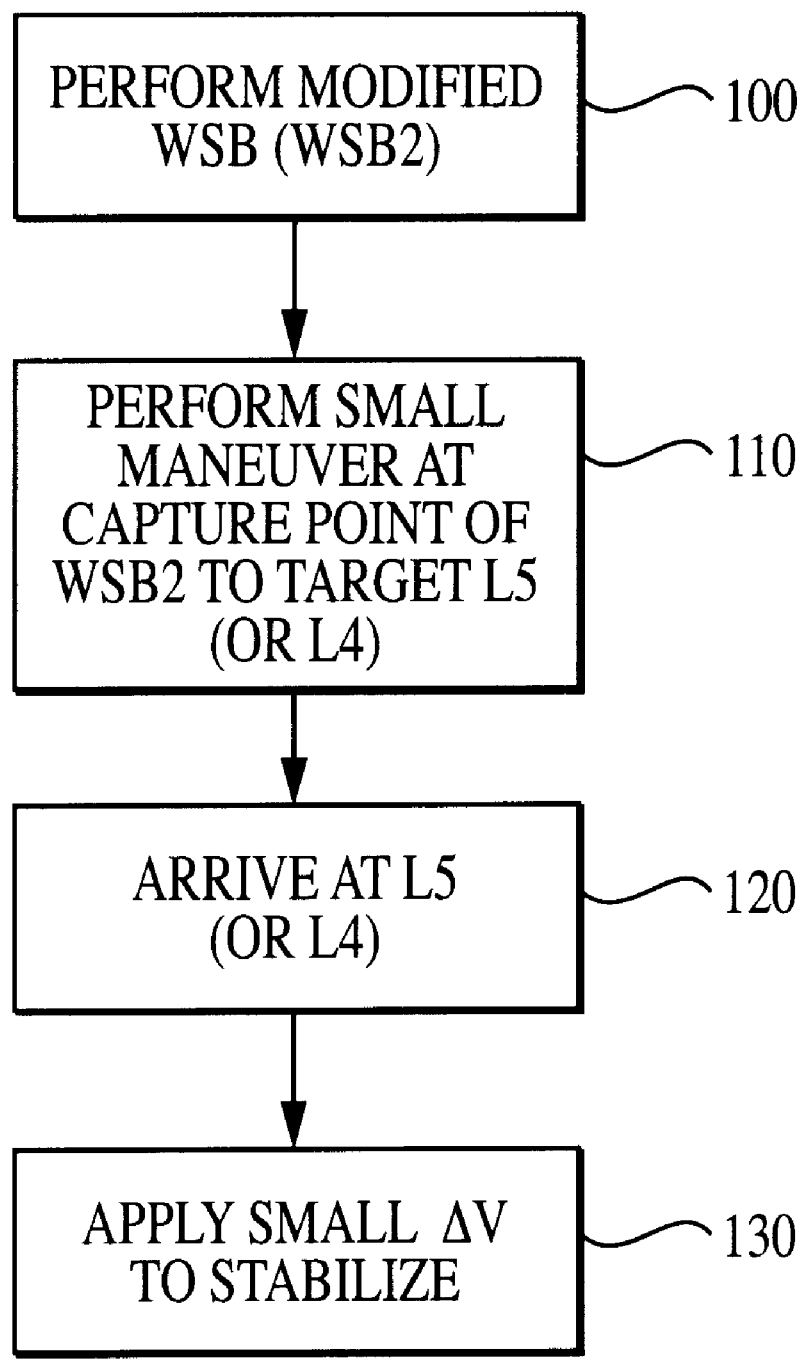
FIG. 17 depicts one example of a process implementable for transferring an object to one of the stable Lagrange points in accordance with the principles of the present invention.

Referring to FIG. 17, a process for implementing the technique of the present invention is discussed. Initially, a modified WSB, and preferably the WSB2, is performed transferring the object from earth or a low earth orbit to the capture point 100. Once at the capture point, the spacecraft is momentarily captured. Then, a small maneuver is performed, targeting the stable Lagrange point 110. Next, the spacecraft arrives at either of L4 or L5 120. From there, another small maneuver may optionally be applied to stabilize the spacecraft 130.

Figure 18:
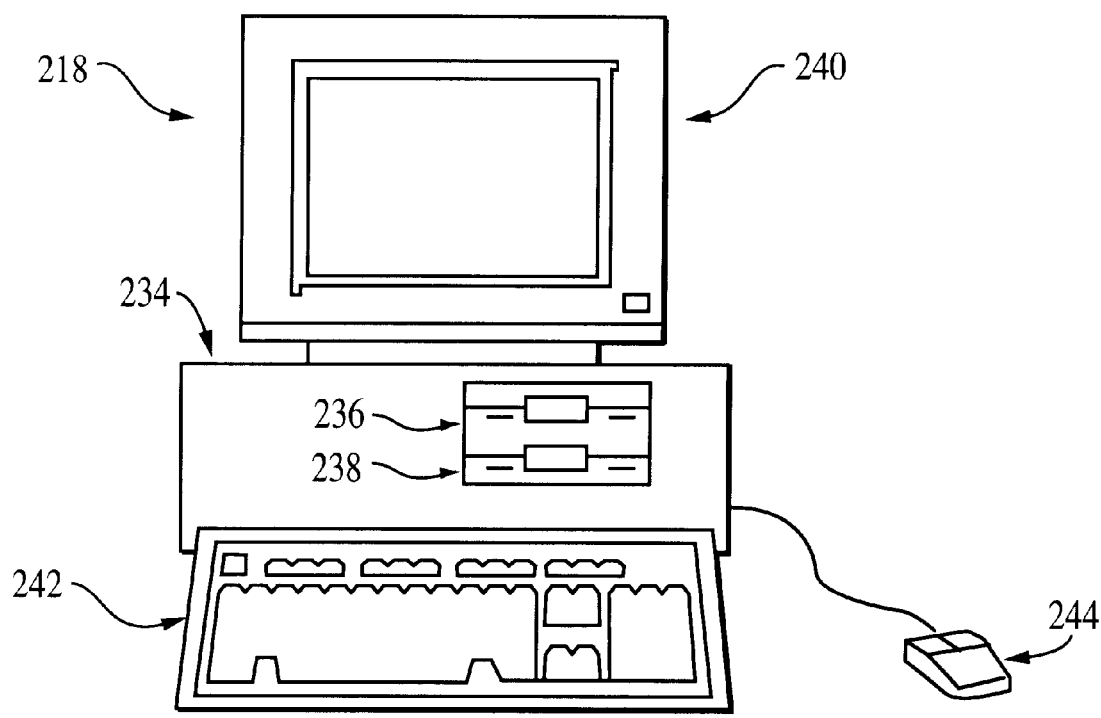
FIG. 18 is a representation of a main central processing unit for implementing the computer processing in accordance with one embodiment of the present invention.

FIG. 18 is a representation of main central processing unit 218 for implementing the computer processing in accordance with one embodiment of the above described methods of the present invention. In FIG. 18, computer system 218 includes central processing unit 234 having disk drives 236 and 238. Disk drive indications 236 and 238 are merely symbolic of the number of disk drives which might be accommodated in this computer system. Typically, these would include a floppy disk drive such as 236, a hard disk drive (not shown either internally or externally) and a CD ROM indicated by slot 238. The number and type of drives varies, typically with different computer configurations. The computer includes display 240 upon which information is displayed. A keyboard 242 and a mouse 244 are typically also available as input devices via a standard interface.

Figure 19:
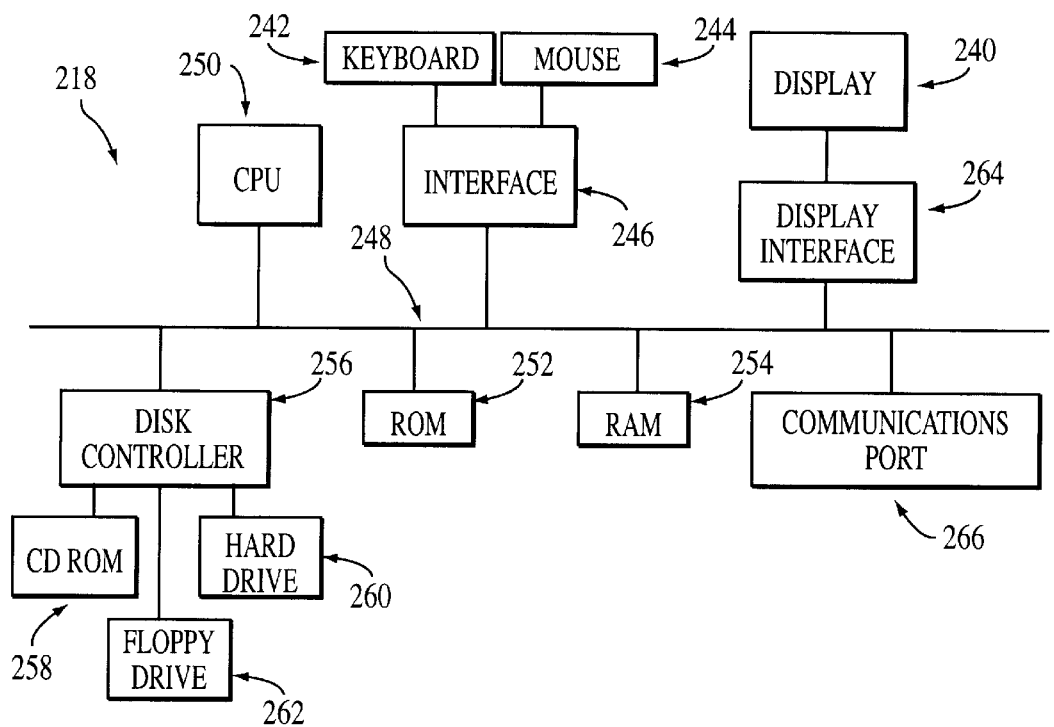
FIG. 19 is a block diagram of the internal hardware of the computer illustrated in FIG. 18.

FIG. 19 is a block diagram of the internal hardware of the computer 218 illustrated in FIG. 18. As illustrated in FIG. 19, data bus 248 serves as the main information highway interconnecting the other components of the computer system. Central processing units (CPU) 250 is the central processing unit of the system performing calculations and logic operations required to execute a program. Read-only memory 252 and random access memory 254 constitute the main memory of the computer, and may be used to store the simulation data.

Disk controller 256 interfaces one or more disk drives to the system bus 248. These disk drives may be floppy disk drives such as 262, internal or external hard drives such as 260, or CD ROM or DVD (digital video disks) drives such as 258. A display interface 264 interfaces with display 240 and permits information from the bus 248 to be displayed on the display 240. Communications with the external devices can occur on communications port 266.

Figure 20:
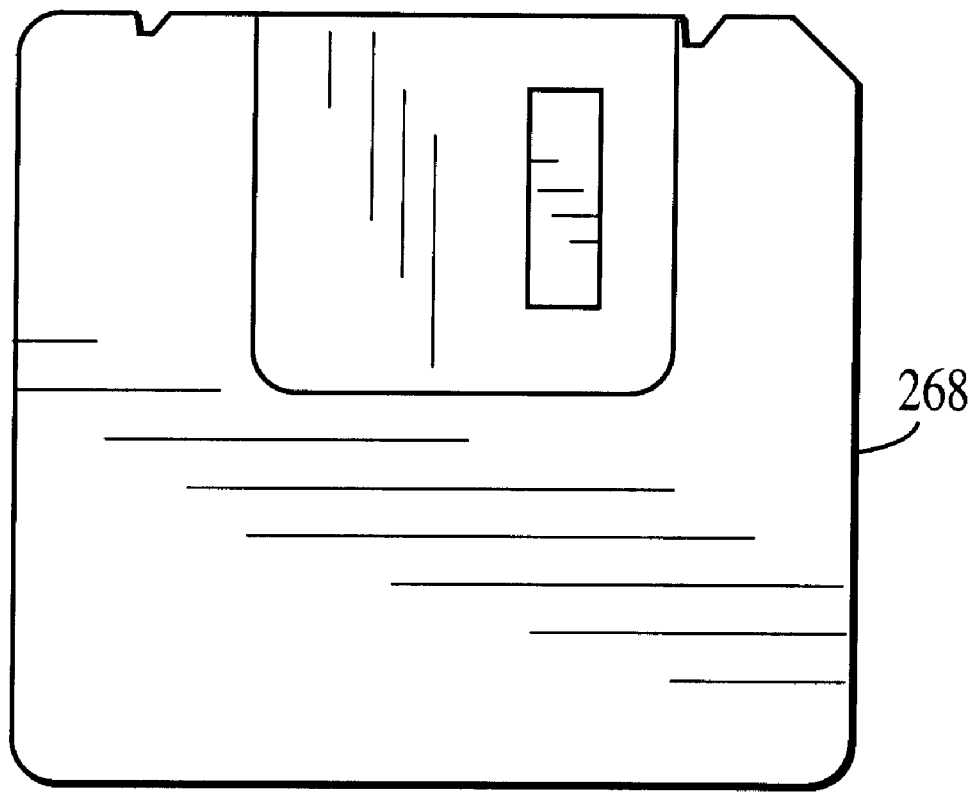
FIG. 20 is an illustration of an exemplary memory medium which can be used with disk drives illustrated in FIGS. 18 and 19.

FIG. 20 is an illustration of an exemplary memory medium which can be used with disk drives such as 262 in FIG. 19 or 236 in FIG. 18. Typically, memory media such as a floppy disk, or a CD ROM, or a digital video disk will contain, inter alia, the program information for controlling the computer to enable the computer to perform the testing and development functions in accordance with the computer system described herein.

Although the processing system is illustrated having a single processor, a single hard disk drive and a single local memory, the processing system may suitably be equipped with any multitude or combination of processors or storage devices. The processing system may, in point of fact, be replaced by, or combined with, any suitable processing system operative in accordance with the principles of the present invention, including sophisticated calculators, and hand-held, laptop/notebook, mini, mainframe and super computers, as well as processing system network combinations of the same.

Conventional processing system architecture is more fully discussed in *Computer Organization and Architecture*, by William Stallings, MacMillam Publishing Co. (3rd ed. 1993); conventional processing system network design is more fully discussed in *Data Network Design*, by Darren L. Spohn, McGraw-Hill, Inc. (1993), and conventional data communications is more fully discussed in *Data Communications Principles*, by R. D. Gitlin, J. F. Hayes and S. B. Weinstain, Plenum Press (1992) and in *The Irwin Handbook of Telecommunications*, by James Harry Green, Irwin Professional Publishing (2nd ed. 1992). Each of the foregoing publications is incorporated herein by reference.

In alternate preferred embodiments, the above-identified processor, and in particular microprocessing circuit, may be replaced by or combined with any other suitable processing circuits, including programmable logic devices, such as PALs (programmable array logic) and PLAs (programmable logic arrays), DSPs (digital signal processors), FPGAs (field programmable gate arrays), ASICs (application specific integrated circuits), VLSIs (very large scale integrated circuits) or the like.

Thus described above is a technique for transferring an object from earth to one of the equilateral Lagrange points L4, L5. The present invention utilizes either a Hohmann transfer, which requires approximately 800 m/s in delta-V to rendevous with either of these locations, or preferably a modified transfer, which takes approximately zero delta-V. By using the modified transfer, the flight time increases from about 3 days to approximately 135 days. Advantageously, these transfers have a flexible launch period. Furthermore, the use of almost zero rendevous delta-V can result in a substantial increase in payload. A basic component of this class of transfers is the operationally tested WSB, or Fuzzy Boundary, lunar transfer.

Furthermore, the techniques and processes of the present invention are easily implementable on, for example, a propagated signal or carrier wave. Thus, the present invention may be embodied as a computer data signal in, for example, an electrical, optical, or acoustical signal or the like and transmitted from, say, one computing device to another remotely located receiver or the like via one or more of any number of communication networks, such as the Internal, LANS, radio waves of any other suitable medium.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for transferring a spacecraft from a first heavenly object or a first heavenly object orbit to a stable Lagrange point, comprising:
    performing a modified weak stability boundary transfer with parameters sufficient to transfer the spacecraft from the first heavenly object or the first heavenly object orbit to a vicinity of a second heavenly object using a forward algorithm,
    allowing momentary capture of the spacecraft at a capture point located in the vicinity of the second heavenly object;
    executing a maneuver at the capture point to target the stable Lagrange point utilizing a substantially negligible amount of propellant; and
    arriving at the stable Lagrange point.

2. The method of claim 1, further comprising executing a second maneuver to transfer the spacecraft into orbit about the stable Lagrange point.

3. The method of claim 2, wherein said second maneuver comprises a delta-V of approximately 40 m/sec.

4. The method of claim 1, wherein the first heavenly object is Earth, the second heavenly object is Earth's Moon, and the stable Lagrange point is L4 or L5.

5. The method of claim 1, wherein said maneuver comprises a delta-V of approximately 35 m/sec.

6. The method of claim 1, wherein the capture point is located in a weak stability boundary characterized such that when said spacecraft is located in said weak stability boundary said spacecraft is affected substantially equally by gravitational perturbations of the earth and of the moon.

7. The method of claim 1, wherein said weak stability boundary transfer is performed considering a gravitational perturbation of the Sun, wherein said gravitational perturbation reduces the spacecraft's travel velocity to facilitate capture at said capture point, and wherein said capture reduces the spacecraft's travel velocity to facilitate targeting of the stable Lagrange point.

8. The method of claim 1, wherein said capture resulting from said modified weak stability boundary transfer requires less energy than a capture resulting from a standard weak stability boundary transfer at lunar periapsis.

9. The method of claim 1, wherein a total delta-V required by said spacecraft is less than approximately 100 m/s.

10. The method of claim 1, wherein said maneuver reduces the spacecraft's travel velocity to facilitate targeting a trajectory to the stable Lagrange point.

11. A method for transferring a spacecraft from a first heavenly object or a first heavenly object orbit to a stable Lagrange point, comprising:
    performing a modified weak stability boundary transfer with parameters sufficient to transfer the spacecraft from the first heavenly object or the first heavenly object orbit to a vicinity of a second heavenly object,
    allowing momentary capture of the spacecraft at a capture point located in the vicinity of the second heavenly object;
    executing a maneuver at the capture point to target the stable Lagrange point utilizing a substantially negligible amount of propellant;
    arriving at the stable Lagrange point;
    wherein said performing a modified weak stability boundary transfer comprises the steps of:
        implementing a forward targeting process by varying the parameters for convergence of target variables at the capture point from the first heavenly object or the first heavenly object orbit; and
        iterating said step of implementing until sufficient convergence to obtain the momentary capture of the spacecraft at the capture point.

12. The method of claim 11, wherein said step of implementing further comprises a step of implementing the forward targeting process by varying velocity magnitude $V_E$, and flight path angle $g_E$ for convergence of the target variables at the capture point, the target variables including radial distance, $r_M$, and inclination $i_M$.

13. The method of claim 11, wherein said step of implementing further comprises a step of implementing the forward targeting process comprising a Newton algorithm, and wherein the Newton algorithm utilizes two control variables including velocity magnitude $V_E$, and flight path angle $g_E$ that are varied to achieve capture conditions at the capture point using two target variables including radial distance, $r_M$, and inclination $i_M$.

14. A method for transferring a spacecraft from a first heavenly object or a first heavenly object orbit to a stable Lagrange point, comprising:
    performing a modified weak stability boundary transfer with parameters sufficient to transfer the spacecraft from the first heavenly object or the first heavenly object orbit to a vicinity of a second heavenly object,
    allowing momentary capture of the spacecraft at a capture point located in the vicinity of the second heavenly object;
    executing a maneuver at the capture point to target the stable Lagrange point utilizing a substantially negligible amount of propellant;

arriving at the stable Lagrange point;

wherein said maneuver comprises reducing a norm of a velocity vector at said capture point.

15. A computer system for facilitating transfer of a spacecraft from a first heavenly object or a first heavenly object orbit to a stable Lagrange point, wherein said computer system comprises a processor, and a memory medium accessible by the processor, said computer system implementing the functions of:

performing a modified weak stability boundary transfer with parameters sufficient to transfer the spacecraft from the first heavenly object or the first heavenly object orbit to a vicinity of a second heavenly object using a forward algorithm, allowing momentary capture of the spacecraft at a capture point located in the vicinity of the second heavenly object;

executing a maneuver at the capture point to target the stable Lagrange point utilizing a substantially negligible amount of propellant; and arriving at the stable Lagrange point.

16. The computer system of claim 15, wherein said computer system further implements the function of executing a second maneuver to transfer the spacecraft into orbit about the stable Lagrange point.

17. The computer system of claim 16, wherein said second maneuver comprises a delta-V of approximately 40 m/sec.

18. The computer system of claim 15, wherein the first heavenly object is Earth, the second heavenly object is Earth's Moon, and the stable Lagrange point is L4 or L5.

19. The computer system of claim 15, wherein said maneuver comprises a delta-V of approximately 35 m/sec.

20. The computer system of claim 15, wherein the capture point is located in a weak stability boundary characterized such that when said spacecraft is located in said weak stability boundary said spacecraft is affected substantially equally by gravitational perturbations of the earth and of the moon.

21. The computer system of claim 15, wherein said weak stability boundary transfer is performed considering a gravitational perturbation of the Sun, wherein said gravitational perturbation reduces the spacecraft's travel velocity to facilitate capture at said capture point, and wherein said capture reduces the spacecraft's travel velocity to facilitate targeting of the stable Lagrange point.

22. The computer system of claim 15, wherein said capture resulting from said modified weak stability boundary transfer requires less energy than a capture resulting from a standard weak stability boundary transfer at lunar periapsis.

23. The computer system of claim 15, wherein a total delta-V required by said spacecraft is less than approximately 100 m/s.

24. The computer system of claim 15, wherein said maneuver reduces the spacecraft's travel velocity to facilitate targeting a trajectory to the stable Lagrange point.

25. A computer system for facilitating transfer of a spacecraft from a first heavenly object or a first heavenly object orbit to a stable Lagrange point, wherein said computer system comprises a processor, and a memory medium accessible by the processor, said computer system implementing the functions of:

performing a modified weak stability boundary transfer with parameters sufficient to transfer the spacecraft from the first heavenly object or the first heavenly object orbit to a vicinity of a second heavenly object, allowing momentary capture of the spacecraft at a capture point located in the vicinity of the second heavenly object;

executing a maneuver at the capture point to target the stable Lagrange point utilizing a substantially negligible amount of propellant;

arriving at the stable Lagrange point;

wherein said performing a modified weak stability boundary transfer comprises the steps of: implementing a forward targeting process by varying the parameters for convergence of target variables at the capture point from the first heavenly object or the first heavenly object orbit; and iterating said step of implementing until sufficient convergence to obtain the momentary capture of the spacecraft at the capture point.

26. The computer system of claim 25, wherein said step of implementing further comprises a step of implementing the forward targeting process by varying velocity magnitude $V_E$, and flight path angle $g_E$ for convergence of the target variables at the capture point, the target variables including radial distance, $r_M$, and inclination $i_M$.

27. The computer system of claim 25, wherein said step of implementing further comprises a step of implementing the forward targeting process comprising a Newton algorithm, and wherein the Newton algorithm utilizes two control variables including velocity magnitude $V_E$, and flight path angle $g_E$ that are varied to achieve capture conditions at the capture point using two target variables including radial distance, $r_M$, and inclination $i_M$.

28. A computer system for facilitating transfer of a spacecraft from a first heavenly object or a first heavenly object orbit to a stable Lagrange point, wherein said computer system comprises a processor, and a memory medium accessible by the processor, said computer system implementing the functions of:

performing a modified weak stability boundary transfer with parameters sufficient to transfer the spacecraft from the first heavenly object or the first heavenly object orbit to a vicinity of a second heavenly object, allowing momentary capture of the spacecraft at a capture point located in the vicinity of the second heavenly object;

executing a maneuver at the capture point to target the stable Lagrange point utilizing a substantially negligible amount of propellant;

arriving at the stable Lagrange point;

wherein said maneuver comprises reducing a norm of a velocity vector at said capture point.

29. A system for facilitating transfer of a spacecraft from a first heavenly object or a first heavenly object orbit to a stable Lagrange point, comprising:

means for facilitating performance of a modified weak stability boundary transfer with parameters sufficient to transfer the spacecraft from the first heavenly object or the first heavenly object orbit to a vicinity of a second heavenly object using a forward algorithm, means for facilitating momentary capture of the spacecraft at a capture point located in the vicinity of the second heavenly object;

means for facilitating execution of a maneuver at the capture point to target the stable Lagrange point utilizing a substantially negligible amount of propellant; and means for facilitating an arrival at the stable Lagrange point.

30. The system of claim 29, further comprising means for facilitating execution of a second maneuver to transfer the spacecraft into orbit about the stable Lagrange point.

31. The system of claim 30, wherein said second maneuver comprises a delta-V of approximately 40 m/sec.

32. The system of claim 29, wherein the first heavenly object is Earth, the second heavenly object is Earth's Moon, and the stable Lagrange point is L4 or L5.

33. The system of claim 29, wherein said maneuver comprises a delta-V of approximately 35 m/sec.

34. The system of claim 29, wherein the capture point is located in a weak stability boundary characterized such that when said spacecraft is located in said weak stability boundary said spacecraft is affected substantially equally by gravitational perturbations of the earth and of the moon.

35. The system of claim 29, wherein said weak stability boundary transfer is performed considering a gravitational perturbation of the Sun, wherein said gravitational perturbation reduces the spacecraft's travel velocity to facilitate capture at said capture point, and wherein said capture reduces the spacecraft's travel velocity to facilitate targeting of the stable Lagrange point.

36. The system of claim 29, wherein said capture resulting from said modified weak stability boundary transfer requires less energy than a capture resulting from a standard weak stability boundary transfer at lunar periapsis.

37. The system of claim 29, wherein a total delta-V required is less than approximately 100 m/s.

38. The system of claim 29, wherein said maneuver reduces the spacecraft's travel velocity to facilitate targeting a trajectory to the stable Lagrange point.

39. A system for facilitating transfer of a spacecraft from a first heavenly object or a first heavenly object orbit to a stable Lagrange point, comprising:

means for facilitating performance of a modified weak stability boundary transfer with parameters sufficient to transfer the spacecraft from the first heavenly object or the first heavenly object orbit to a vicinity of a second heavenly object, means for facilitating momentary capture of the spacecraft at a capture point located in the vicinity of the second heavenly object;

means for facilitating execution of a maneuver at the capture point to target the stable Lagrange point utilizing a substantially negligible amount of propellant;

means for facilitating an arrival at the stable Lagrange point;

means for implementing a forward targeting process by varying the parameters for convergence of target variables at the capture point from the first heavenly object or the first heavenly object orbit; and means for iterating said step of implementing until sufficient convergence to obtain the momentary capture of the spacecraft at the capture point.

40. The system of claim 39, wherein said means for implementing further comprises means for implementing the forward targeting process by varying velocity magnitude $V_E$, and flight path angle $g_E$ for convergence of the target variables at the capture point, the target variables including radial distance, $r_M$, and inclination $i_M$.

41. The system of claim 39, wherein said means for implementing further comprises means for implementing the forward targeting process comprising a Newton algorithm, and wherein the Newton algorithm utilizes two control variables including velocity magnitude $V_E$, and flight path angle $g_E$ that are varied to achieve capture conditions at the capture point using two target variables including radial distance, $r_M$, and inclination $i_M$.

42. A system for facilitating transfer of a spacecraft from a first heavenly object or a first heavenly object orbit to a stable Lagrange point, comprising:

means for facilitating performance of a modified weak stability boundary transfer with parameters sufficient to transfer the spacecraft from the first heavenly object or the first heavenly object orbit to a vicinity of a second heavenly object, means for facilitating momentary capture of the spacecraft at a capture point located in the vicinity of the second heavenly object;

means for facilitating execution of a maneuver at the capture point to target the stable Lagrange point utilizing a substantially negligible amount of propellant;

means for facilitating an arrival at the stable Lagrange point;

wherein said maneuver comprises reducing a norm of a velocity vector at said capture point.

43. A computer program product for transferring a spacecraft or object from a first heavenly object or a first heavenly object orbit to a substantially stable Lagrange point comprising:

a memory medium;

a computer program stored on said medium, said program containing instructions comprising: performing a modified weak stability boundary transfer with parameters sufficient to transfer the spacecraft or object from the first heavenly object or the first heavenly object orbit to a vicinity of a second heavenly object or second heavenly object orbit using a forward algorithm, allowing substantial capture of the spacecraft or the object at a capture point located in the vicinity of the second heavenly object or the second heavenly object orbit; executing at least a negligible maneuver at the capture point to target the substantially stable Lagrange point utilizing at least a negligible amount of propellant, to facilitate arrival at the substantially stable Lagrange point.

44. The computer program product of claim 43, further comprising instructions for executing a second maneuver to transfer the spacecraft into orbit about the stable Lagrange point.

45. The computer program product of claim 44, wherein said second maneuver comprises a delta-V of approximately 40 m/sec.

46. The computer program product of claim 43, wherein the first heavenly object is Earth, the second heavenly object is Earth's Moon, and the stable Lagrange point is L4 or L5.

47. The computer program product of claim 43, wherein said maneuver comprises a delta-V of approximately 35 m/sec.

48. The computer program product of claim 43, wherein the capture point is located in a weak stability boundary characterized such that when said spacecraft is located in said weak stability boundary said spacecraft is affected substantially equally by gravitational perturbations of the earth and of the moon.

49. The computer program of claim 43, wherein said weak stability boundary transfer is performed considering a gravitational perturbation of the Sun, wherein said gravitational perturbation reduces the spacecraft's travel velocity to facilitate capture at said capture point, and wherein said capture reduces the spacecraft's travel velocity to facilitate targeting of the stable Lagrange point.

50. The computer program of claim 43, wherein said capture resulting from said modified weak stability boundary transfer requires less energy than a capture resulting from a standard weak stability boundary transfer at lunar periapsis.

51. The computer program of claim 43, wherein a total delta-V required by said spacecraft is less than approximately 100 m/s.

52. The computer program of claim 43, wherein said maneuver reduces the spacecraft's travel velocity to facilitate targeting a trajectory to the stable Lagrange point.

53. The computer program of claim 43, wherein said substantial capture of the spacecraft or object occurs only momentarily.

54. A computer program product for transferring a spacecraft or object from a first heavenly object or a first heavenly object orbit to a substantially stable Lagrange point comprising:
   a memory medium;
   a computer program stored on said medium, said program containing instructions comprising: performing a modified weak stability boundary transfer with parameters sufficient to transfer the spacecraft or object from the first heavenly object or the first heavenly object orbit to a vicinity of a second heavenly object or second heavenly object orbit, allowing substantial capture of the spacecraft or the object at a capture point located in the vicinity of the second heavenly object or the second heavenly object orbit; executing at least a negligible maneuver at the capture point to target the substantially stable Lagrange point utilizing at least a negligible amount of propellant, to facilitate arrival at the substantially stable Lagrange point;
   wherein said performing a modified weak stability boundary transfer comprises the steps of:
      implementing a forward targeting process by varying the parameters for convergence of target variables at the capture point from the first heavenly object or the first heavenly object orbit; and
      iterating said step of implementing until sufficient convergence to obtain the momentary capture of the spacecraft at the capture point.

55. The computer program product of claim 54, wherein said step of implementing further comprises a step of implementing the forward targeting process by varying velocity magnitude $V_E$, and flight path angle $g_E$ for convergence of the target variables at the capture point, the target variables including radial distance, $r_M$, and inclination $i_M$.

56. The computer program product of claim 54, wherein said step of implementing further comprises a step of implementing the forward targeting process comprising a Newton algorithm, and wherein the Newton algorithm utilizes two control variables including velocity magnitude $V_E$, and flight path angle $g_E$ that are varied to achieve capture conditions at the capture point using two target variables including radial distance, $r_M$, and inclination $i_M$.

57. A computer program product for transferring a spacecraft or object from a first heavenly object or a first heavenly object orbit to a substantially stable Lagrange point comprising:
   a memory medium;
   a computer program stored on said medium, said program containing instructions comprising: performing a modified weak stability boundary transfer with parameters sufficient to transfer the spacecraft or object from the first heavenly object or the first heavenly object orbit to a vicinity of a second heavenly object or second heavenly object orbit, allowing substantial capture of the spacecraft or the object at a capture point located in the vicinity of the second heavenly object or the second heavenly object orbit; executing at least a negligible maneuver at the capture point to target the substantially stable Lagrange point utilizing at least a negligible amount of propellant, to facilitate arrival at the substantially stable Lagrange point;
   wherein said maneuver comprises reducing a norm of a velocity vector at said capture point.

* * * * *